(12) United States Patent
Gupta et al.

(10) Patent No.: US 9,951,262 B2
(45) Date of Patent: *Apr. 24, 2018

(54) WELL SERVICING FLUID

(71) Applicant: BAKER HUGHES INCORPORATED, Houston, TX (US)

(72) Inventors: D.V. Satyanarayana Gupta, The Woodlands, TX (US); Kay Elaine Cawiezel, Fullshear, TX (US); Rupa Venugopal, Katy, TX (US); Tanhee Ary Galindo, Spring, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/945,298

(22) Filed: Nov. 18, 2015

(65) Prior Publication Data

US 2016/0068740 A1    Mar. 10, 2016

Related U.S. Application Data

(62) Division of application No. 12/833,799, filed on Jul. 9, 2010, now Pat. No. 9,217,103.

(51) Int. Cl.
| | |
|---|---|
| *C09K 8/52* | (2006.01) |
| *C09K 8/68* | (2006.01) |
| *C09K 8/88* | (2006.01) |
| *C09K 8/70* | (2006.01) |
| *C09K 8/80* | (2006.01) |

(52) U.S. Cl.
CPC .............. *C09K 8/52* (2013.01); *C09K 8/68* (2013.01); *C09K 8/685* (2013.01); *C09K 8/70* (2013.01); *C09K 8/80* (2013.01); *C09K 8/882* (2013.01); *C09K 8/887* (2013.01)

(58) Field of Classification Search
CPC .......... C09K 8/685; C09K 8/68; C09K 8/588; C09K 8/70; C09K 8/882; C09K 2208/08; C09K 8/74; C09K 15/30; C09K 2208/26; C09K 8/035; C09K 8/52; C09K 8/584; C09K 8/725; C09K 8/80; C09K 8/887; E21B 43/26

See application file for complete search history.

(56) References Cited

U.S. PATENT DOCUMENTS

| | | | |
|---|---|---|---|
| 4,336,145 A | 6/1982 | Briscoe | |
| 4,398,921 A | 8/1983 | Rifkin et al. | |
| 4,440,659 A | 4/1984 | Chen et al. | |
| 4,488,975 A * | 12/1984 | Almond ................. | C09K 8/685 166/308.5 |
| 4,796,702 A * | 1/1989 | Scherubel .............. | C09K 8/536 166/308.6 |
| 5,069,283 A | 12/1991 | Mack | |
| 5,874,510 A | 2/1999 | Kwak et al. | |
| 7,049,436 B2 | 5/2006 | Gupta et al. | |
| 7,431,106 B2 | 10/2008 | Alberty | |
| 7,919,437 B2 | 4/2011 | Duncum et al. | |
| 2005/0028979 A1 * | 2/2005 | Brannon ................... | C09K 8/62 166/280.2 |
| 2006/0073980 A1 | 4/2006 | Brannon et al. | |
| 2007/0270316 A1 * | 11/2007 | El Shaari ............... | C09K 8/685 507/201 |
| 2008/0099207 A1 * | 5/2008 | Venditto ................... | C09K 8/52 166/308.3 |
| 2008/0217012 A1 | 9/2008 | Delorey et al. | |

OTHER PUBLICATIONS

Scifinder document downloaded on Apr. 18, 2017.*
"Safety Data Sheet (1907/2006)" International Specialty Products, Sep. 23, 2009.
L.Rivas, et al., "Development and Use of High Density Fracturing Fluid in Deep Water Gulf of Mexico Frac and Packs", SPE 116007, Society of Petroleum Engineers 2008.
Canadian Intellectual Property Office; Office Action issued in Canadian Patent Application No. 2,744,620; dated Sep. 5, 2012.
US Patent and Trademark Office; Office Action issued in U.S. Appl. No. 12/833,799; dated Apr. 20, 2015.
"Successful Breaker Optimization for Polyacrylamide Friction Reducers Used in Slickwater Fracturing" P.S. Carman, SPE, and K.E. Cawiezel, SPE, BJ Services Co.; SPE 106162, pp. 1-9 Jan. 1, 2007.
Flow back : Schlumberger oilfield glossary. Retrieved Jun. 14, 2012 from http://www.glossary.oilfield.slb.com/Display.cfm? Term=flow %20back Jun. 14, 2012.
"Brine," retrieved from http://en.wikipedia.org/wiki/Brine on Jul. 18, 2013.
US Patent and Trademark Office; Office Action issued in U.S. Appl. No. 12/833,799; dated Jun. 25, 2012.
US Patent and Trademark Office; Office Action issued in U.S. Appl. No. 12/833,799; dated Mar. 12, 2013.
US Patent and Trademark Office; Final Office Action issued in U.S. Appl. No. 12/833,799; dated Jul. 22, 2013.
"Succinic Acid" Wikipedia, retrieved from http://en.wikipedia.org/wiki/Succinic_acid, on Mar. 16, 2007.
"Sales Specifications Stabileze QM" International Specialty Products, retrieved from the Internet on Feb. 22, 2006.
"Property Chart", Stabileze, International Safety Products, dated Jun. 19, 2000.
"Rheology Modifiers", Stabileze, International Specialty Products copyright 2005.
James B. Crews, et al. , "New Technology Improves Performance of Viscoelastic Surfactant Fluids", SPE Drilling & Completion, Mar. 2008.
"Maleic Anhydride" Wikipeida, retrieved from http://en.wikipedia.org/wiki/Maleic_anhydride on Mar. 16, 2007.
"Maleic Acid" Wikipedia, retrieved from http://en.wikipedia.org/wiki/Maleic_acid on Mar. 16, 2007.

* cited by examiner

*Primary Examiner* — Kumar R Bhushan
(74) *Attorney, Agent, or Firm* — Parsons Behle & Latimer

(57) ABSTRACT

A well servicing fluid formulated with ingredients comprising a viscosifying polymer that is a crosslinked copolymer of an ethylenically unsaturated dicarboxylic anhydride and an alkyl vinyl ether, or the di-acid thereof; a pH adjuster capable of maintaining a pH of 5.5 or greater; and a solvent. Methods of treating a well formation with the wellbore servicing fluid and methods of making the wellbore servicing fluid.

24 Claims, 27 Drawing Sheets

| RPM | SHEAR RATE (SEC-1) | 75% METHANOL, 60 PPT STABILEZE QM | 75% METHANOL, 20 PPT STABILEZE QM | 75% METHANOL, 15 PPT STABILEZE QM | 80% METHANOL, 60 PPT STABILEZE QM | 80% METHANOL, 40 PPT STABILEZE QM | 90% METHANOL, 60 PPT STABILEZE QM | 90% METHANOL, 40 PPT STABILEZE QM | 95% METHANOL, 60 PPT STABILEZE QM | 80% METHANOL, 20 PPT STABILEZE QM | 80% METHANOL, 40 PPT STABILEZE QM, 1 GPT CT-3C |
|---|---|---|---|---|---|---|---|---|---|---|---|
| 1 | 1.7 | 6375 | 3185 | 367 | 30500 | 24500 | 24900 | 5911 | 10300 | | 1679 |
| 3 | 5.1 | 2800 | 1425 | 231 | 11800 | 9600 | 9900 | 2410 | 5147 | | 776 |
| 6 | 10.2 | 1740 | 881 | 186 | 6620 | 5400 | 5570 | 1430 | 3013 | 44 | 497 |
| 10 | 17 | 1250 | 623 | 150 | 4360 | 3580 | 3660 | 984 | 2032 | 28 | 361 |
| 30 | 51 | 760 | 319 | 102 | 1880 | 1560 | 1570 | 480 | 907 | 27 | 193 |
| 60 | 102 | 560 | 214 | 79 | 1140 | 952 | 945 | 314 | 556 | 23 | 134 |
| 100 | 170 | 450 | 162 | 65 | 802 | 673 | 660 | 232 | 394 | 20 | 103 |
| 300 | 510 | 240 | 92 | 43 | 353 | 336 | 323 | 130 | 197 | 16 | 59 |

*FIG. 1*

| SHEAR RATE (S-1) | 80% MEOH, 60 PPT STABILEZE 90° F | 80% MEOH, 60 PPT STABILEZE 110°F | 80% MEOH, 60 PPT STABILEZE 130°F | 80% MEOH, 60 PPT STABILEZE 150°F |
|---|---|---|---|---|
| 100 | 779 | 713 | 650 | 586 |
| 75 | 920 | 846 | 772 | 694 |
| 50 | 1152 | 1064 | 974 | 877 |
| 25 | 1644 | 1536 | 1410 | 1264 |

| SHEAR RATE (S-1) | 90% MEOH & 60 PPT 90°F | 90% MEOH & 60 PPT 110°F | 90% MEOH & 60 PPT 130°F | 90% MEOH & 60 PPT 150°F |
|---|---|---|---|---|
| 100 | 820 | 775 | 656 | 559 |
| 75 | 976 | 921 | 781 | 668 |
| 50 | 1232 | 1166 | 988 | 846 |
| 25 | 1781 | 1697 | 1431 | 1228 |

| SHEAR RATE (S-1) | 80% MEOH & 40 PPT 72° F | 80% MEOH & 40 PPT 110°F | 80% MEOH & 40 PPT 150°F | 80% MEOH & 40 PPT 200°F | 80% MEOH & 40 PPT 250°F |
|---|---|---|---|---|---|
| 100 | 1119 | 958 | 753 | 515 | 305 |
| 75 | 1323 | 1141 | 895 | 613 | 363 |
| 50 | 1661 | 1446 | 1142 | 783 | 460 |
| 25 | 2364 | 2077 | 1649 | 1135 | 663 |

| SHEAR RATE (S-1) | 80% MEOH & 60 PPT 72°F | 80% MEOH & 60 PPT 110°F | 80% MEOH & 60 PPT 150°F | 80% MEOH & 60 PPT 200°F | 80% MEOH & 60 PPT 250°F |
|---|---|---|---|---|---|
| 100 | 2055 | 1598 | 1372 | 988 | 455 |
| 75 | 2429 | 1899 | 1641 | 1175 | 537 |
| 50 | 3013 | 2371 | 2053 | 1469 | 655 |
| 25 | 4092 | 3238 | 2812 | 2013 | 891 |

| SHEAR RATE (S-1) | 95% MEOH & 60 PPT 73°F | 95% MEOH & 60 PPT 110°F | 95% MEOH & 60 PPT 150°F | 95% MEOH & 60 PPT 200°F | 95% MEOH & 60 PPT 250°F |
|---|---|---|---|---|---|
| 100 | 402 | 280 | 159 | 67 | 33 |
| 75 | 473 | 327 | 187 | 79 | 40 |
| 50 | 588 | 409 | 232 | 98 | 53 |
| 25 | 826 | 580 | 329 | 141 | 79 |

| RPM | SHEAR RATE (S-1) | 80% METHANOL, 60 PPT STABILEZE QM (MIX METHOD-HEATED TO 160F) | 80% METHANOL, 60 PPT STABILEZE QM (STABILEZE ADDED TO MEOH AND WATER THEN .5 ML NAOH ADDED) |
|---|---|---|---|
| 1 | 1.7 | 30,500 | 46,000 |
| 3 | 5.1 | 11,800 | 25,000 |
| 6 | 10.2 | 6,620 | 14,000 |
| 10 | 17 | 4,360 | 9,500 |
| 30 | 51 | 1,880 | 3,330 |
| 60 | 102 | 1,140 | 1,666 |
| 100 | 170 | 802 | 1,000 |
| 300 | 510 | 353 | 334 |

| RPM | SHEAR RATE (S-1) | 2% STABILEZE WITH 10.8 PPG NA/K FORMATE | | |
|---|---|---|---|---|
| | | AT AMBIENT TEMPERATURE | AT 107°F | AFTER COOLING TO AMBIENT TEMPERATURE AT 1 HR |
| 1 | 1.7 | 0 | 559 | 654 |
| 3 | 5.1 | 46 | 304 | 359 |
| 6 | 10.2 | 79 | 222 | 262 |
| 10 | 17 | 82 | 177 | 210 |
| 20 | 34 | 85 | 142 | 170 |
| 30 | 51 | 82 | 124 | 149 |
| 60 | 102 | 73 | 101 | 115 |
| 100 | 170 | 66 | 86 | 102 |
| 300 | 510 | 53 | 64 | 74 |
| 600 | 1020 | 47 | 54 | 63 |

| RPM | SHEAR RATE (SEC-1) | 15.6PPG CESIUM/POTASSIUM FORMATE WITH 2% STABILEZE | | |
|---|---|---|---|---|
| | | AMBIENT TEMPERATURE | 107°F(1HR) | AFTER 1HR UPON COOLING TO AMBIENT TEMPERATURE |
| 1 | 1.7 | 0 | 8.6 | 13.7 |
| 3 | 5.1 | 3.6 | 23.5 | 20.9 |
| 6 | 10.2 | 43.1 | 62.9 | 72.2 |
| 10 | 17 | 56.6 | 74.3 | 81.7 |
| 20 | 34 | 67.6 | 81.1 | 90.3 |
| 30 | 51 | 69.3 | 79.3 | 88.3 |
| 60 | 102 | 67.9 | 74 | 83.1 |
| 100 | 170 | 64.8 | 69 | 77.9 |
| 300 | 510 | 57.4 | 58.7 | 67.4 |
| 600 | 1020 | 54.1 | 53.4 | 62.9 |

| RPM | SHEAR RATE (S-1) | 2% STABILEZE WITH 18.5PPG CESIUM FORMATE | | | |
|---|---|---|---|---|---|
| | | AT AMBIENT TEMPERATURE | AT 107°F | AT 107°F 1 HR AT TEMPERATURE | AFTER COOLING TO AMBIENT TEMPERATURE |
| 1 | 1.7 | 82 | 84 | 247 | 309 |
| 3 | 5.1 | 78 | 179 | 255 | 221 |
| 6 | 10.2 | 70 | 168 | 212 | 178 |
| 10 | 17 | 68 | 145 | 181 | 151 |
| 20 | 34 | 66 | 128 | 150 | 124 |
| 30 | 51 | 62 | 114 | 127 | 109 |
| 60 | 102 | 56 | 92 | 98 | 89 |
| 100 | 170 | 50 | 74 | 80 | 77 |
| 300 | 510 | 39 | 54 | 55 | 59 |
| 600 | 1020 | 36 | 43 | 45 | 52 |

| RPM | SHEAR RATE (S-1) | 2% STABILEZE WITH 18.5PPG CESIUM FORMATE | | | |
| --- | --- | --- | --- | --- | --- |
| | | AT 140°F | AT 140°F (FOR MORE THAN 15 MIN) | AT 180°F | AT 180°F (FOR MORE THAN 15 MINUTES) |
| 1 | 1.7 | 875 | | 1254 | 5605 |
| 3 | 5.1 | 418 | 683 | 540 | 2304 |
| 6 | 10.2 | 286 | 500 | 336 | 1392 |
| 10 | 17 | 217 | 386 | 238 | 1015 |
| 20 | 34 | 159 | 307 | 166 | 693 |
| 30 | 51 | 129 | 257 | 133 | 552 |
| 60 | 102 | 94 | 183 | 94 | 387 |
| 100 | 170 | 75 | 62 | 75 | 308 |
| 300 | 510 | 51 | 36 | 50 | 203 |
| 600 | 1020 | 42 | 27 | 40 | 161 |

| RPM | SHEAR RATE (SEC-1) | 12PPG SODIUM BROMIDE WITH 3% STABILEZE AT PH=7.0 | | | |
|---|---|---|---|---|---|
| | | AMBIENT TEMPERATURE | 107°F(1HR) | 107°F (20HR) | 140°F(1HR) |
| 1 | 1.7 | 8603 | 10776 | 11408 | 6560 |
| 3 | 5.1 | 4003 | 4285 | 4331 | 2769 |
| 6 | 10.2 | 2363 | 2337 | 2541.5 | 1777 |
| 10 | 17 | 1729 | 1614.7 | 1816.9 | 1446 |
| 20 | 34 | 1108 | 912.2 | 1127.7 | 969 |
| 30 | 51 | 896 | 664.5 | 869.6 | 793.7 |
| 60 | 102 | 696.8 | 409.4 | 497.9 | 471.2 |
| 100 | 170 | 456.7 | 273.3 | 331.3 | 315.5 |
| 300 | 510 | 249.6 | 132.4 | 199.6 | 164.7 |
| 600 | 1020 | 169.3 | 92.6 | 128 | 103.5 |

| RPM | SHEAR RATE (SEC-1) | 12PPG SODIUM BROMIDE WITH 3% STABILEZE AT PH=8.0 | | | |
|---|---|---|---|---|---|
| | | AMBIENT TEMPERATURE | 107°F(1HR) | 107°F (20HR) | 140°F(1HR) |
| 1 | 1.7 | 7890 | 8293 | 10231.2 | 9036 |
| 3 | 5.1 | 3743 | 3798 | 4180 | 3793 |
| 6 | 10.2 | 2262 | 2208 | 2328 | 2097 |
| 10 | 17 | 1610 | 1486 | 1477.2 | 1383.6 |
| 20 | 34 | 1066.1 | 858.1 | 914.3 | 780.5 |
| 30 | 51 | 827.1 | 632.9 | 672.2 | 557.6 |
| 60 | 102 | 495 | 380.8 | 420.9 | 325.6 |
| 100 | 170 | 343.1 | 262.4 | 278.4 | 218.7 |
| 300 | 510 | 204.8 | 113.3 | 136 | 95.7 |
| 600 | 1020 | 140.3 | 64.8 | 99.3 | 47.3 |

| RPM | SHEAR RATE (SEC-1) | 12PPG SODIUM BROMIDE WITH 3% STABILEZE AT PH=10.0 | | | |
|---|---|---|---|---|---|
| | | AMBIENT TEMPERATURE | 107°F(1HR) | 107°F (20HR) | 140°F(1HR) |
| 1 | 1.7 | 10205 | 9568 | 10816 | 8764 |
| 3 | 5.1 | 4450 | 4621 | 4180 | 3239 |
| 6 | 10.2 | 2407 | 2362.2 | 2303.1 | 1773.8 |
| 10 | 17 | 1643.5 | 1509.2 | 1498.1 | 1141 |
| 20 | 34 | 1059 | 857.1 | 848.2 | 645 |
| 30 | 51 | 845 | 621 | 617.6 | 471 |
| 60 | 102 | 555.6 | 365.2 | 380.3 | 287.5 |
| 100 | 170 | 409.2 | 245.2 | 261.8 | 197.8 |
| 300 | 510 | 219.9 | 107.2 | 121.8 | 95.9 |
| 600 | 1020 | 145.7 | 56.3 | 82.3 | 52.8 |

WELL SERVICING FLUID

CROSS REFERENCE TO RELATED APPLICATIONS

This application is a divisional of and claims priority to U.S. patent application Ser. No. 12/833,799, filed Jul. 9, 2010, entitled "Well Servicing Fluid," which is herein incorporated by reference.

FIELD OF THE DISCLOSURE

The present disclosure relates generally to a well servicing fluid useful for treating hydrocarbon producing wells, such as oil and natural gas wells.

BACKGROUND

Hydraulic fracturing is a common stimulation technique used to enhance production of fluids from subterranean formations in, for example, oil, gas, coal bed methane, and geothermal wells. In a typical hydraulic fracturing treatment operation, a viscosified fracturing fluid is pumped at high pressures and high rates into a wellbore penetrating a subterranean formation to initiate and propagate a hydraulic fracture in the formation. Subsequent stages of viscosified fracturing fluid containing particulate matter known as proppant, e.g., graded sand, ceramic particles, bauxite, or resin coated sand, are then typically pumped into the created fracture. The proppant becomes deposited into the fractures, forming a permeable proppant pack. Once the treatment is completed, the fracture closes onto the proppant pack, which maintains the fracture and provides a fluid pathway for hydrocarbons and/or other formation fluids to flow into the wellbore.

Water or hydrocarbons have been commonly used as base fluids for fracturing. While usually effective, water-based fluids can be harmful to certain types of formations, and are not effective at removing excess water from a well (removing "water blocks").

It is preferable that a fracturing fluid be compatible with carbon dioxide or other gases. As used herein, the fluid or the polymer therein is "compatible" if it does not form a significant amount of precipitate upon contact with the gas. Addition of carbon dioxide to a fracturing fluid provides gas pressure to assist in returning fluids to the wellbore after treatment.

The use of alcohols as base fluids has been previously suggested. Advantages of alcohols over water-based fluids include low freezing points, low surface tensions, high water solubilities, high vapor pressures, and good compatibility with formations. Alcohols have several potential safety issues relating to their low flash points, high vapor densities, and invisibility of flame. These safety issues can be properly addressed by skilled operators to minimize any associated risks.

Methanol foams have been prepared using synthetic polymers (polyacrylamide and polyethylene oxide). Attempts were made to crosslink the gelled methanol using metal crosslinking compounds. These include the use of titanium crosslinked fluids marketed by service companies, such as, for example, METHOFRAC™ 3, available from BJ Services Company LLC, and METHOFRAC XL, also available from BJ Services Company LLC. These typically contain several percent of water, either for gelling and/or for breaking the gels. The titanium crosslinked polymers in the fluids do not break completely without the water and also do not perform well at temperatures greater than 90° C. Without water, this polymer system is not compatible with carbon dioxide.

A modified guar polymer was reported to dissolve in anhydrous methanol and crosslinked with a borate complexor. The resulting complex was broken with an oxidizing breaker. This polymer as well as the borate crosslinking compound are not compatible with carbon dioxide (i.e. formed a precipitate and the borate crosslink was reversed).

SPE 13565 (S. C. Crema and R. R. Alm, 1985; presented at the International Symposium on Oilfield and Geothermal Chemistry, Phoenix, Ariz., Apr. 9 11, 1985) describes the preparation of foamed anhydrous methanol. The foamed material is offered for the stimulation of water sensitive formations. The foams contain a fluorosurfactant and a foam extender. The foam extender allows a reduction in the amount of fluorosurfactant needed. Example foam extenders include oxyalkylated fatty alcohols and amines or polyethers containing ethylene and propylene oxide units. Foamed fluids have limited viscosity, and as a result, their practical application is limited.

SPE 14656 (C. M. Fairless and W. Joseph, 1986; prepared for presentation at the East Texas Regional Meeting of the Society of Petroleum Engineers, Tyler, Tex., Apr. 21 22, 1986) describes the use of a two-phase structured system for the treatment of wells. Vaporized carbon dioxide is dispersed as an internal phase in a gelled complexed methanol external phase to produce a foam. The foams were used to treat water sensitive formations.

SPE 22800 (J. E. Thompson et al., July 1992) suggests a continuous mix process for gelling anhydrous methanol. The continuous mix process is suggested as a less risky alternative to batch processing. Additionally, the continuous process achieved full fluid viscosity in a reduced amount of time, and the performance of the produced materials was similar.

SPE 27007 (J. M Hernandez et al., 1994; prepared for presentation at the Latin American/Caribbean Petroleum Engineering Conference, Buenos Aires, Argentina, Apr. 27 29, 1994) presents a comparison of methanol and other fluids as fracture fluids in gas wells. Methanol was shown to provide additional stimulation near the fracture faces, decrease the saturation of water in the zone, and increased the gas permeability of the formation SPE 35577 (D. B. Bennion, et al., 1996; prepared for presentation at the Gas Technology Conference, Calgary, Alberta, Canada, Apr. 29 May 1, 1996) offers a review of efforts taken to obtain natural gas in low permeability sandstone and carbonate formations. Methanol is suggested as being able to significantly reduce interfacial tension between water-gas or oil-gas systems.

SPE 70009 (Mark R. Malone, 2001; prepared for presentation at the SPE Permian Basin Oil and Gas Recovery Conference, Midland, Tex., May 15 16, 2001) describes the use of crosslinked methanol fracturing fluids in water-sensitive formations. A crosslinked methanol system was prepared using hydroxypropyl guar, encapsulated ammonium persulfate breaker, and liquid carbon dioxide. Case histories were described using the fracturing fluids in test wells.

Another type of well servicing fluid is gravel packing fluid. Gravel packing fluid has relatively large grained sand, e.g., gravel, suspended therein that may be utilized to prevent migration of smaller grained sand from the subterranean formation into the well bore and to maintain the integrity of the formation. In gravel packing operations, a permeable screen may be placed against the face of the subterranean formation, followed by pumping the gravel packing fluid into the annulus of the well bore such that gravel becomes packed against the exterior of the screen.

Gravel packing fluids are often aqueous based fluids. The aqueous base is known to include either freshwater, produced water or brines. Gravel packing fluids generally include a viscosifier that can provide appropriate viscosity to allow effective suspension and/or transport of the gravel.

While advances have been made in well servicing fluids, further improvements in well servicing fluids would be a welcome addition in the field.

SUMMARY

The well servicing fluids of the present disclosure can provide one or more of the following advantages: shear thinning properties suitable for transporting proppant; high/low shear viscosity suitable for transporting proppant; improved fluid loss control, reduced damage to the formation, improved ability to maintain viscosity at elevated temperatures, and alcohol containing compositions that have improved compatibility with carbon dioxide.

An embodiment of the present disclosure is directed to a well servicing fluid. The well servicing fluid is formulated with ingredients comprising a viscosifying polymer that is a crosslinked copolymer of an ethylenically unsaturated dicarboxylic anhydride and an alkyl vinyl ether, or the di-acid thereof; a pH adjuster capable of maintaining a pH of 5.5 or greater; and a solvent.

Another embodiment of the present disclosure is directed to a method of treating a well formation with a wellbore servicing fluid. The method comprises providing well servicing fluid formulated with ingredients comprising: a viscosifying polymer that is a crosslinked copolymer of an ethylenically unsaturated dicarboxylic anhydride and an alkyl vinyl ether, or the di-acid thereof; a pH adjuster capable of maintaining a pH of 5.5 or greater; and a solvent. The method further comprises introducing the well servicing fluid into a wellbore; and contacting the formation with the wellbore servicing fluid.

Yet another embodiment of the present disclosure is directed to a method of making a well servicing fluid. The method comprises mixing a viscosifying polymer and a solvent at a first pH, the viscosifying polymer being a crosslinked copolymer of an ethylenically unsaturated dicarboxylic anhydride and an alkyl vinyl ether, or the di-acid thereof. A pH adjuster is mixed with the well servicing fluid to increase the first pH to a range of 5.5 or greater.

BRIEF DESCRIPTION OF THE DRAWINGS

FIG. 1 shows a table of OFITE® M900 viscosity data for different concentrations of STABILEZE® QM and methanol solutions at about 75° F.

Figure 2:
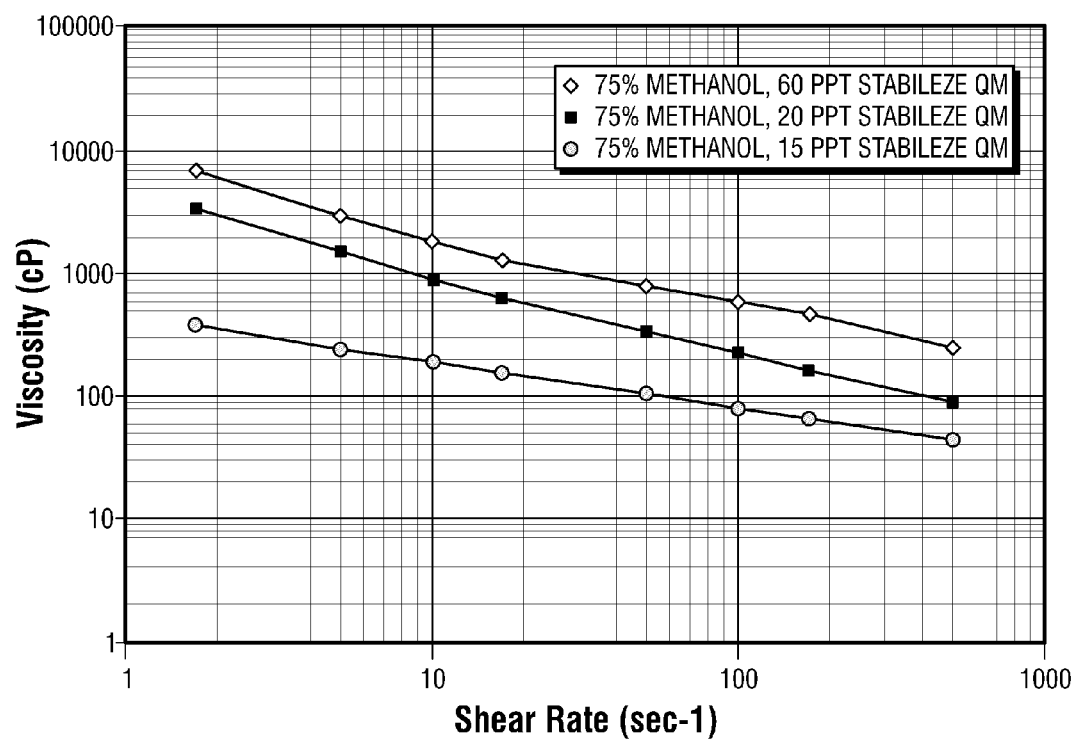
FIG. 2 shows a graph of OFITE M900 viscosity data for different concentrations of STABILEZE QM in 75% methanol in water solutions at 75 F.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

The present disclosure is directed to a well servicing fluid for use in various applications, such as fracturing and gravel pack operations. In an embodiment, the well servicing fluid can be formulated with a viscosifying polymer that is a crosslinked copolymer of an ethylenically unsaturated dicarboxylic anhydride and an alkyl vinyl ether; or the di-acid thereof. In addition to the viscosifying polymer, the well servicing fluids of the present disclosure can include a pH adjuster and at least one solvent chosen from alcohol and an aqueous solvent, such as freshwater, produced water or brines, as discussed in greater detail below.

The Polymer

The viscosifying polymer can be a crosslinked copolymer of an ethylenically unsaturated dicarboxylic anhydride and an alkyl vinyl ether; or the di-acid thereof.

Any suitable alkyl vinyl ether can be employed. For example, suitable ethers include those with the general formal ROR', where R is a $C_1$-$C_4$ alkyl and R' is vinyl group. In an embodiment, the ether is methyl vinyl ether.

Any suitable ethylenically unsaturated dicarboxylic anhydrides can be employed. An example of a suitable anhydride is maleic anhydride.

Any suitable crosslinking compound can be employed. Examples of suitable crosslinking compounds include diolefins, such as alpha, omega dienes having from 4 to 20 carbon atoms. In an embodiment, the crosslinking compound can be 1,9 decadiene.

Viscosifying polymers usable in the formulations of the present disclosure are well known in the art. One example of such a visocifying polymer is a poly (methyl vinyl ether/maleic anhydride) decadiene crosspolymer, which is available under the tradename STABILEZE QM, from International Specialty Products of Wayne, N.J. A suitable example of a di-acid viscosifying polymer is poly (methyl vinyl ether/maleic acid) decadiene crosspolymer, which is available under the tradename STABILEZE XL-80W, from International Specialty Products of Wayne, N.J.

In an embodiment, the polymer can be formed by reacting an alkyl vinyl ether, maleic anhydride and a crosslinking compound. A suitable polymer initiator may also be employed. A known method of making polymers that can be employed in the formulations according to an embodiment of the present disclosure is described in U.S. Pat. No. 5,874,510, issued Feb. 23, 1999, to Yoon Tae Kwak, et al., the disclosure of which is hereby incorporated by reference in its entirety. The process is described for making a crosslinked polymer of maleic anhydride and methyl vinyl ether in high yield. The process comprises precharging methyl vinyl ether, partially or totally, in isopropyl acetate and a crosslinker, into a reactor maintained at about 60° to 80° C. Then continuous separate streams of molten maleic anhydride and, if desired, the rest of methyl vinyl ether, are fed into the reactor. The reaction mixture then is polymerized at a temperature of about 60° to 80° C. A pumpable, homogeneous suspension of the desired crosslinked copolymer at a solids level of about 20-50 wt. % is formed. The reaction product is then pumped from the reactor, the solvent is removed and the product is filtered. A fine white powder of the crosslinked copolymer is obtained. In an embodiment, the crosslinker is 1,9-decadiene, which is present in an amount of at least 2.5 weight %; an initiator is employed, which can be, for example, 2,2'-azobis(2-methylbutanenitrile) or decanoyl peroxide; an excess of methyl vinyl ether can be present during the polymerization over the 1:1 mole ratio in the copolymer, the solids level of the resultant suspension is about 30-50%, and an excess of methyl vinyl ether is added continuously during the polymerization.

The viscosifying polymer can be employed to viscosify alcohol or aqueous based mixtures, including fresh water, produced water, saturated brines and unsaturated brines, such as heavy brines or seawater. When the polymer is dispensed in the aqueous based mixtures, the acyl groups of the anhydride ring may hydrolyze to give free di-acid groups.

pH Adjuster

A pH adjuster can be used to raise the pH and gel the viscosifying polymer in order to provide a desired viscosity. Any suitable pH adjuster capable of achieving or maintaining a workable pH can be employed. Suitable pH adjusters can include NaOH, KOH, $Ca(OH)_2$, sodium bicarbonate, potassium carbonate, and sodium carbonate. The desired pH for viscosifying the fluid can be 5.5 or greater, such as a pH ranging from about 7 to about 10 or 12.

Breakers

The breaker can generally be any breaker functional to degrade the polymer under downhole conditions. In an embodiment, the breaker can generally be any oxidizing agent or encapsulated oxidizing agent. For example, the breaker can be a percarbonate, a perchlorate, a peracid, a peroxide, or a persulfate. The breaker can be encapsulated or unencapsulated. As an alternative to encapsulation, a low solubility breaker can be used. Specific examples of breakers include sodium persulfate and encapsulated potassium persulfate.

Solvent

The solvent can be any suitable organic or aqueous based solvent in which the polymer can dissolve. If the solvent is organic, it can be advantageous for water to be soluble therein. Suitable organic solvents include alcohols, such as methanol, ethanol, 2-propanol (isopropyl alcohol), 1-butanol and 2-butanol.

The solvent can be a mixture of both water and organic solvent. In such mixtures, any amount of water can be employed. In an embodiment, the solvent can comprise at least 20% by weight alcohol, based on the total weight of the solvent. For example, the solvent can comprise 35% to 85% by weight alcohol, with the remaining solvent being an aqueous solvent, such as water, brine or produced water.

In an alternative embodiment, the solvent is substantially nonaqueous, where the term "substantially nonaqueous" can mean that that solvent includes 5% by weight water or less, based on the total weight of the solvent. Commercially available alcohol solvents often contain several percent of water (e.g., commercial methanol typically contains about 2 percent water). If a well servicing fluid is to be used to remove water form a down-hole formation, nonaqueous solvents with about 5% by weight water or less, or about 2% by weight water or less, can be used.

In another embodiment, the solvent does not comprise substantial amounts of alcohol (e.g., is a substantially 100% aqueous based solvent). Any suitable aqueous solvents can be employed. Examples of suitable aqueous solvents include fresh water, brine, produced water, and combinations thereof.

The brine may be any brine that serves as a suitable media for the various components. As a matter of convenience, in some cases the brine may be the brine available at the site where the well servicing fluid is to be used. The brines may be prepared using salts, such as halide salts and formates including, but not limited to, NaCl, KCl, $CaCl_2$, $MgCl_2$, $NH_4Cl$, $CaBr_2$, $ZnBr_2$, $NaBr_2$, sodium formate, potassium formate, cesium formate and any other stimulation and completion brine salts. In an embodiment, the brine can be seawater. Brines based on halide salts and formates, in particular, can be difficult to viscosify. The ability of the disclosed viscosification polymers to viscosify such brines can be an advantage of the viscosifying polymers in an embodiment of the present disclosure.

The concentration of the salts in the brines can range from about 0.5% by weight of water up to saturation for a given salt. Example concentrations of salts include 10%, 20%, 30% or more salt by weight of water. The brine may be a combination of one or more of the mentioned salts, such as, for example, a brine prepared using NaCl and $CaCl_2$; NaCl, $CaCl_2$, NaBr and $CaBr_2$; sodium formate and potassium formate; or cesium formate and potassium formate.

In an embodiment, the aqueous based solvent can be a heavy brine. Heavy brines are defined as aqueous based solvents having a density greater than 9 ppg. Examples can include sodium chloride based brines having a density of up to 10 ppg; calcium chloride brines having a density of up to 11.5 ppg; potassium chloride brines having a density up to 9.7 ppg; sodium formate brines having a density up to 10.9 ppg; NaCl/NaBr brines having a density up to 12.5 ppg; $CaCl_2/CaBr_2$ brines having a density up to 15.1 ppg; NaBr brines having a density up to 12.5 ppg; $CaBr_2$ brines having a density up to 15.3 ppg; Na/K formate brines having a density up to 13.1 ppg; Potassium formate brines having a density up to 13.1 ppg; $CaBr_2/ZnBr_2$ brines having a density up to 19.2 ppg; $ZnBr_2$ brines having a density up to 21 ppg and cesium formate brines having a density up to 19.3 ppg.

The total solvent can be a majority, by weight, of the well servicing fluid. The term majority is defined herein to mean 50% by weight or more. In an embodiment, the solvent concentration can range from about 75% to about 95% by weight based on the total weight of the well servicing fluid.

Carbon Dioxide

The well servicing fluid can further comprise nitrogen ($N_2$) or carbon dioxide ($CO_2$). The nitrogen or carbon dioxide can be present as a gas, as a liquid, or as a supercritical fluid. Typically, under hydraulic fracturing conditions, nitrogen is a gas and carbon dioxide exists either as a liquid or as a supercritical fluid.

Proppants

Proppants can be mixed with the well servicing fluids of the present disclosure. Any suitable proppant can be employed. Examples of suitable proppant includes graded sand, glass or ceramic beads or particles, sized calcium carbonate and other sized salts, bauxite grains, resin coated sand or particles, walnut shell fragments, aluminum pellets, nylon pellets, and combinations of the above.

Proppants are well known to be used in concentrations ranging from about 0.05 to about 14 pounds per gallon (about 6 to about 1700 $kg/m^3$) of fracturing fluid composition, but higher or lower concentrations can be used as desired for the particular fracture design.

Other Ingredients

The well servicing fluid can comprise at least one additional compound chosen from surfactants, non-emulsifiers, additional viscosifying agents, clay stabilization additives, scale dissolvers, biopolymer degradation additives, fluid loss control additives, high temperature stabilizers, and other common and/or optional components.

Methods

The present disclosure is also directed to a method of servicing a wellbore. The method comprises providing a well servicing fluid. The well servicing fluid is formulated with ingredients comprising: a viscosifying polymer that is a crosslinked copolymer of an ethylenically unsaturated dicarboxylic anhydride and an alkyl vinyl ether; or the di-acid thereof. In addition to the viscosifying polymer, the well servicing fluids of the present disclosure can include a pH adjuster and at least one solvent chosen from alcohol and an aqueous solvent. The method further comprises introducing the well servicing fluid into a well; and contacting the formation with the wellbore servicing fluid.

The providing step can involve obtaining the well servicing fluid in a prepared condition, or can involve obtaining the component ingredients and preparing the well servicing fluid on site.

The well servicing fluid can further comprise any of the ingredients discussed above, such as nitrogen, carbon dioxide, and proppant. The solvent can be any of the aqueous or organic solvents discussed above, or mixtures thereof. The pH adjuster can be any of those discussed above. The breaker can be any of the breakers discussed above, including percarbonate, a perchlorate, a peracid, a peroxide, sodium persulfate, or encapsulated potassium persulfate.

The method can further comprise removing the well servicing fluid from the formation after the fluid contacts the formation. This removing step can be aided by gas pressure caused by the carbon dioxide or nitrogen. The contacting and removing steps can remove water from the formation. For effective removal of water from the formation, it is preferred that the well servicing fluid have reduced levels of water (if any water). The removed well servicing fluid can be recovered, recycled or disposed of according to industry standard practices.

The removing step can be performed at any time after the well servicing fluid contacts the formation. For example, the contacting step can be performed for a sufficient time for removing water, followed by the removing step. Alternatively, the well can be "shut in", where the contacting step is performed for a prolonged period of time. The length of time can be as short as immediate flow back or for up to several days (e.g. 2 or 3 days) shut in.

In an embodiment, the well servicing fluids of the present disclosure are introduced as a gravel pack fluid into a wellbore. Any suitable gravel packing technique can be employed. Various techniques for gravel packing wells are generally well known in the art. In an embodiment, the well bore servicing fluid comprising a crosslinked viscosifying polymer, a pH adjuster and a solvent, can further comprise gravel suspended therein. As part of the gravel packing process, a permeable screen may be placed against the face of a subterranean formation, followed by pumping the well bore servicing fluid comprising the gravel into the annulus of the well bore such that gravel becomes packed against the formation on the exterior of the screen.

The well bore servicing fluids of the present application can also be employed as fracturing or frac pack fluids. Any suitable fracturing or frac packing technique can be employed. Various techniques for fracturing and frac packing wells are generally well known in the art. The well bore servicing fluid comprising a crosslinked viscosifying polymer, a pH adjuster and a solvent is pumped into the well bore at a rate and a pressure sufficient to form fractures that extend into the subterranean formation, providing additional pathways through which fluids being produced can flow into the well bores. In an embodiment, the well bore servicing fluid can include a proppant. Well known proppants used in fracturing and frac packing operations include, for example, graded sand, bauxite, or resin coated sand. Any other suitable proppant can be suspended in the fracturing fluid. The proppant becomes deposited into the fractures and thus holds the fractures open after the pressure exerted on the fracturing fluid has been released.

While the fluids are described herein as having use in fracturing fluids and as gravel pack fluids, it is expected that the fluids of the present disclosure will find utility in completion fluids, fluid loss pills, lost circulation pills, diverter fluids, foamed fluids, stimulation fluids, and coiled tubing cleanout fluids used to clean the well bore, and the like.

The present disclosure is also directed to a method of making a well servicing fluid. The method comprises mixing a viscosifying polymer and a solvent at a pH of less than 7, such as about 5.5 or less. Any of the vicosifying polymers and solvents disclosed herein can be used. The solvent can be an aqueous or organic based solvent, where the concentration of the solvent is 50% by weight or more of the well servicing fluid. The mixture can be heated to a suitable temperature for dissolving the viscosifying polymers in the solvent. Suitable temperatures can be any temperature at which the viscosifying polymer will dissolve, such as, for example, 150° F. or more. In an embodiment, the viscosifying polymers are mixed in a solvent comprising organic fluids, such as alcohol, without heating (e.g., mixing at room temperature) in order to dissolve the viscosifying polymer. After the viscosifying polymer has been solubilized to a desired degree in the solvent, the pH of the mixture can be raised by adding a pH adjuster to provide the desired viscosification of the fluid. For example, the pH can be raised to a pH 5.5 or greater, such as a pH ranging from about 7 to about 10 or 12.

The present disclosure will be further described with respect to the following Examples, which are not meant to limit the invention, but rather to further illustrate the various embodiments.

EXAMPLES

Organic Solvent Formulations

Testing was carried out to determine if an example polymer of the present disclosure, having a tradename of STABILEZE QM, can be used to viscosify solutions containing up to 100% Methanol. The results are described in the examples below. The example formulations employed methanol as a solvent. The methanol fluid compositions can be used in, for example, unconventional reservoirs. The fluid also has other applications such as a coiled tubing cleanout fluid.

The STABILEZE QM polymer is manufactured by ISP and is used in, for example, hair gel product applications. STABILEZE QM is a methyl vinyl ether-maleic anhydride copolymer crosslinked with 1,9-decadiene.

The STABILEZE QM was mixed in Methanol solutions. This involved adding the STABILEZE QM to a Methanol-water mixture and neutralizing to a pH of 7 with 25% sodium hydroxide. As the sodium hydroxide was added, the fluid gelled.

Test Procedures:

Initially, the fluid used for example solutions was prepared by heating water to 160° F. to dissolve the STABILEZE QM polymer. During the course of the testing, an easier mixing procedure was found in which the STABILEZE QM was added to a water/methanol mixture that did not require heating the fluid. Both procedures are described below. Test data showed that fluids prepared using both methods had similar rheological performance.

Methanol solutions were made using the following formulations and the procedures that follow:

Fluid Heated to 160° F.

For the example solutions prepared by heating, the grams needed to obtain the concentration of STABILEZE QM were added to tap water to form a 200 mL solution. The solution was mixed for 2 minutes using an overhead Servodyne mixer at 1500 RPM. The STABILEZE QM dispersed in the water created a white, cloudy solution. The water solution was then placed in a 160° F. water bath for 15 minutes. After 15 minutes, the solution was mixed for 2 minutes (only slight cooling was allowed), and the corresponding volume of Methanol was added. While mixing, the solution was neutralized using 25% NaOH (about 0.20-0.25 mL) to pH 7. The solution began to gel.

Fluid with Caustic Addition

For example solutions prepared by mixing with caustic, the STABILEZE QM was added to a Methanol-water mixture while stirring on an overhead stirrer without heating. While mixing, the solution was neutralized using the caustic (25% NaOH) to a pH 7. The solution began to gel.

When referring to "caustic" in the examples below, a 25% by weight NaOH solution was employed.

OFITE M900 Procedure

For examples that were evaluated using the OFITE M900, as discussed below, base gel viscosity was measured on an OFITE M900 viscometer using a R1B1 rotor-bob configuration with a closed cup. The viscosity was measured at 1, 3, 6, 10, 30, 60, 100, 300 rpm and ramped down.

Fann 50 Procedure

In the Fann 50 testing discussed below, the fluid was initially sheared at 100 sec-1 followed by a shear rate sweep of 100, 80, 60, and 40 s$^{-1}$, at room temperature, to calculate power law indices n and K. The fluid was sheared at 100 s$^{-1}$ in between shear rate sweeps, and the shear rate sweep was repeated as reported. A RIBS rotor-bob configuration was used. Test temperature ranges were 75° F.-150° F. and 75° F.-250° F.

OFITE M900 Tests for Methanol Fluids

Before running a series of Fann 50 tests on the different STABILEZE QM solutions, the viscosity was measured using the OFITE M900 viscometer. The results for these OFITE M900 tests are shown in the table of FIG. 1 and the charts of FIGS. 2-8.

Tests and Test Formulations

A. Fann 50 Tests were performed with Shear Ramps (100, 75, 50, 25) and Temp Ramps (90° F.-150° F. and 75° F.-250° F.) using the following formulations:

| A1. | 80% Methanol<br>60 pptg STABILEZE QM @ (90° F.-150° F.) mixture. |
|---|---|
| A2. | 90% Methanol<br>60 pptg STABILEZE QM @ (90° F.-150° F.) mixture. |

Figures 11, 12:
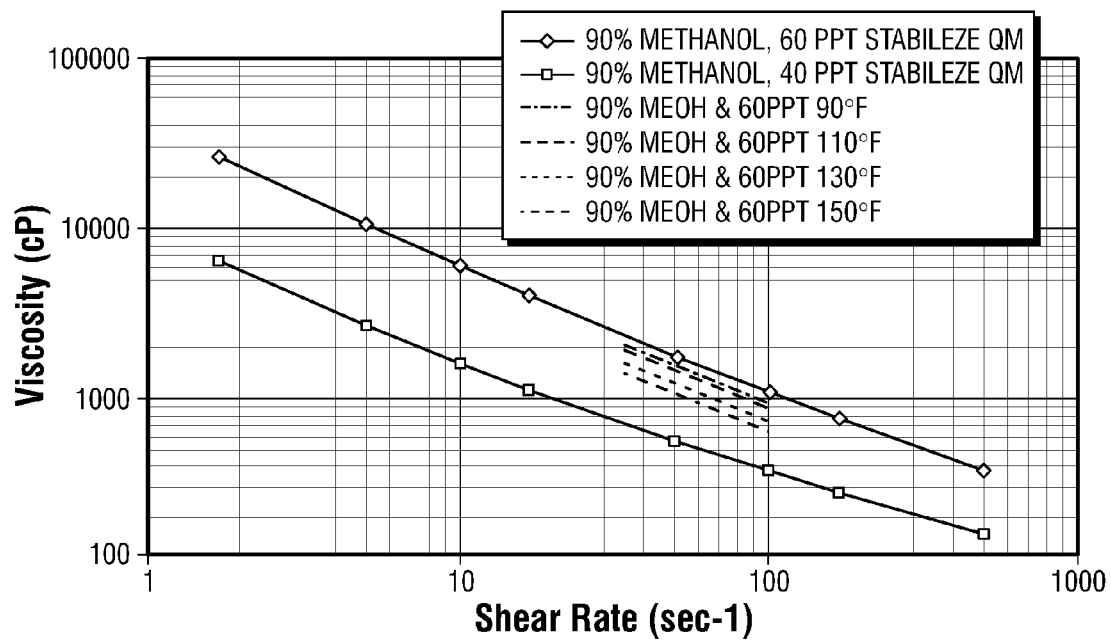
FIG. 11 shows a table of Fann 50 viscosity Data for 90% Methanol in water solution and 60 pptg STABILEZE QM @ 90-150° F. and 100-25 $\sec^{-1}$.
FIG. 12 shows a graph of Fann 50 Viscosity Data for the 90% Methanol in water solution and 60 pptg STABILEZE QM @ 90° F.-150° F. and 100-25 $\sec^{-1}$.
Figure 13:
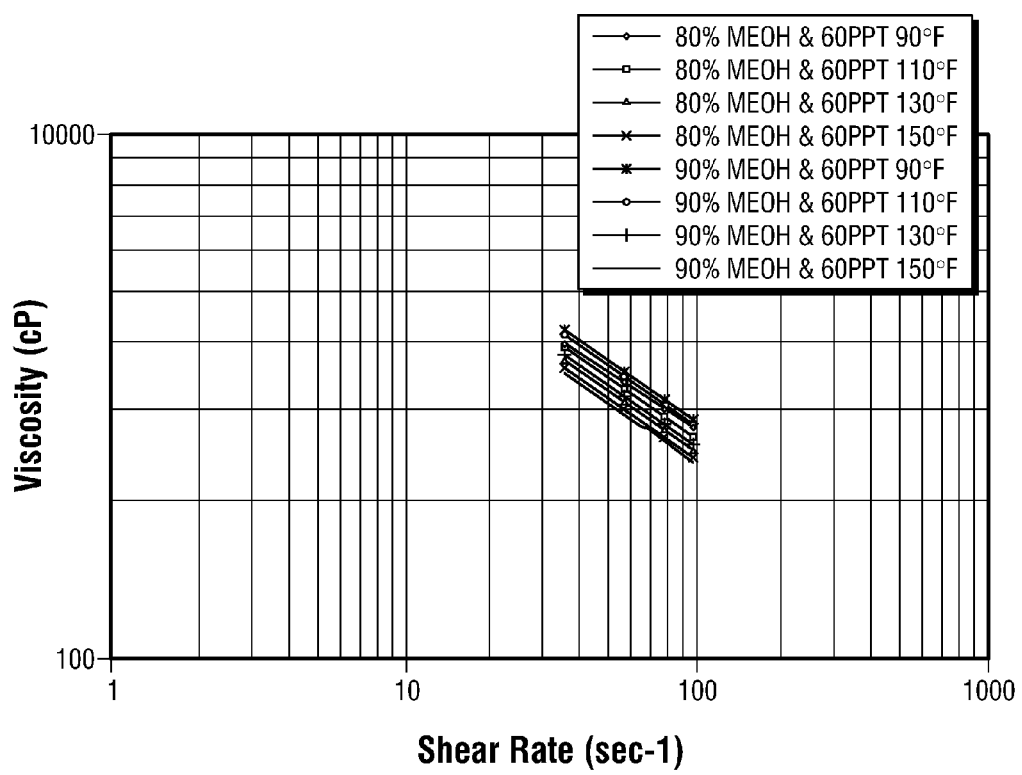
FIG. 13 shows a graph of Fann 50 Viscosity Data for the 80% Methanol and 90% Methanol and 60 pptg STABILEZE QM @ 90° F.-150° F. and 100-25 $\sec^{-1}$.

Temperature was increased 20 degrees every thirty minutes and a Shear Ramp from about 100, 75, 50, 25 sec-1 for every temperature. These results are shown in FIG. 11 and FIG. 12. FIG. 13 shows the FIG. 10 and FIG. 12 data combined.

B. Fann 50 Tests were also performed with Shear Ramps (about 100, 75, 50, 25) and Temp Ramps (75° F.-250° F.) using the following formulations:

| B1. | 80% Methanol<br>40 pptg STABILEZE QM @ (75° F.-250° F.) |
|---|---|
| B2. | 80% Methanol<br>60 pptg STABILEZE QM @ (75° F.-250° F.) |
| B3. | 95% Methanol<br>60 pptg STABILEZE QM @ (75° F.-250° F.) |

Figures 14, 15:
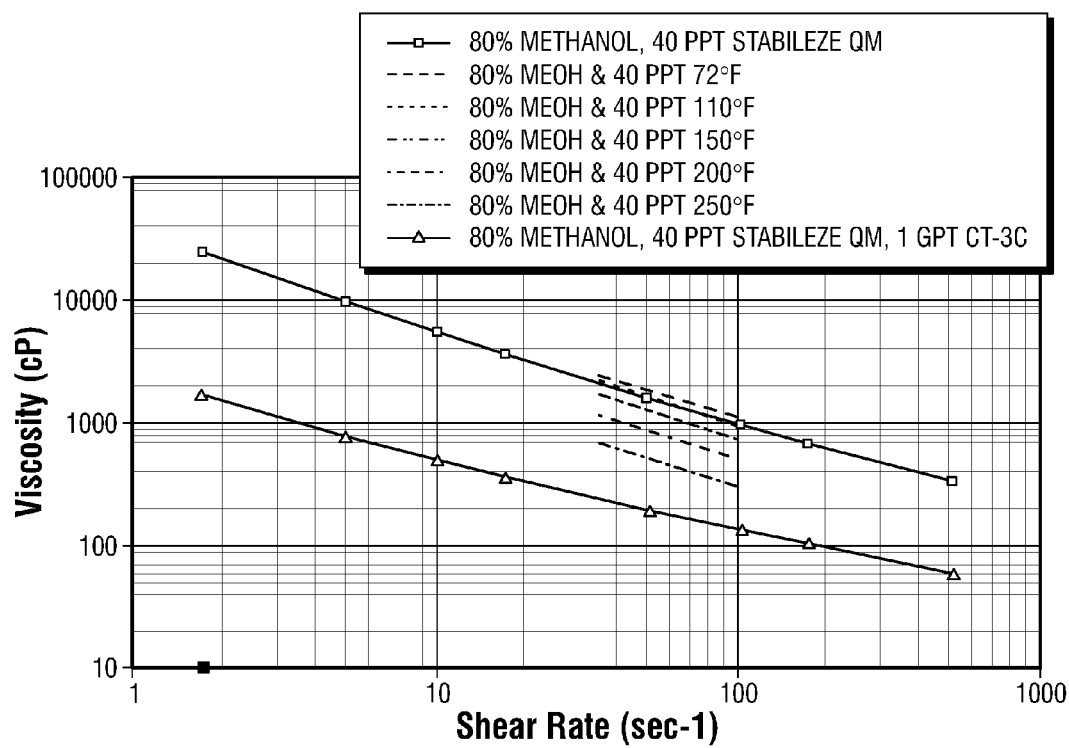
FIG. 14 shows a table of Fann 50 Viscosity Data for 80% Methanol in water solution and 40 pptg STABILEZE QM @ 75° F.-250° F. and 100-25 $\sec^{-1}$.
FIG. 15 shows a graph of Fann 50 Viscosity Data for 80% Methanol and 40 pptg STABILEZE QM @ 75° F.-250° F. and 100-25 $\sec^{-1}$.
Figure 16:
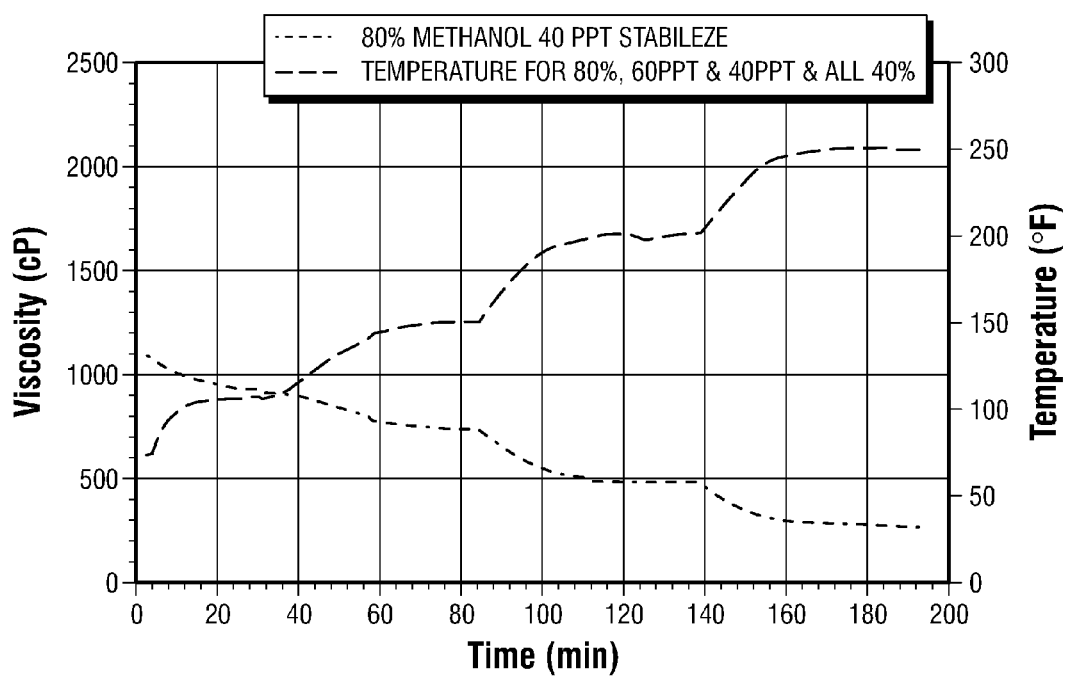
FIG. 16 shows a graph of Fann 50 Results for the 80% Methanol and 40 pptg STABILEZE QM @ 75° F.-250° F. @ 100 $\sec^{-1}$.
Figures 17, 18:
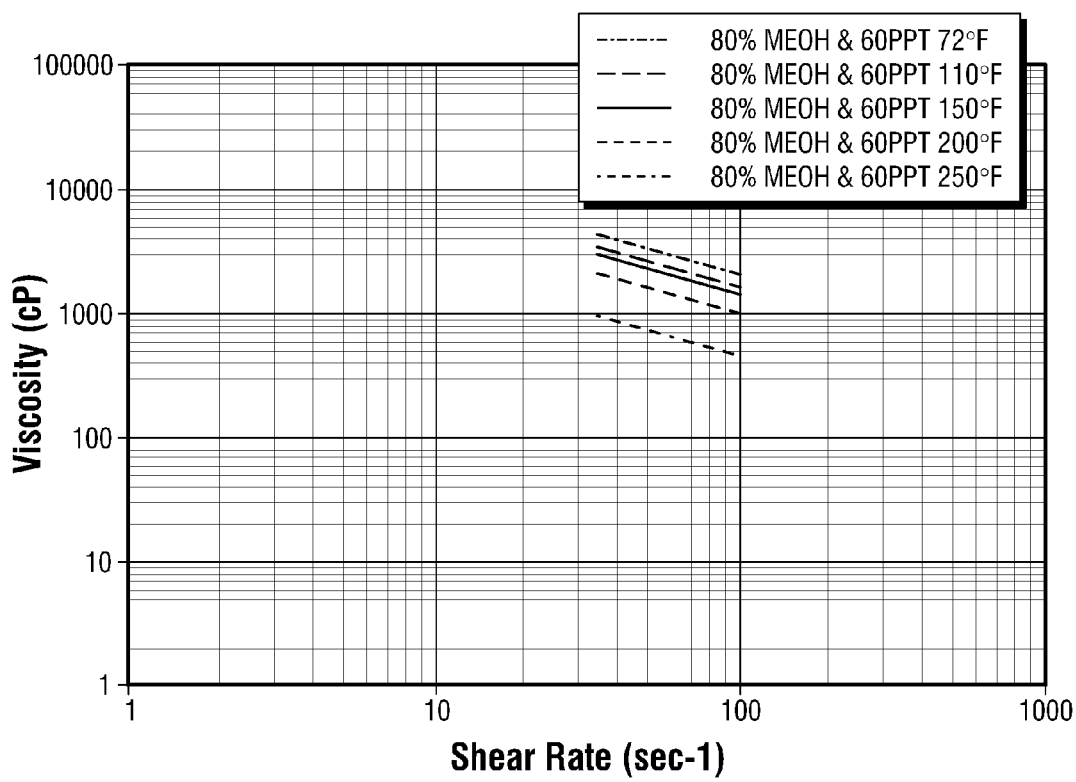
FIG. 17 shows a table of Fann 50 Viscosity Data for 80% Methanol in water solution and 60 pptg STABILEZE QM @ 75° F.-250° F. and 100-25 $\sec^{-1}$.
FIG. 18 shows a graph of Fann 50 Results for the 80% Methanol in water solution and 60 pptg STABILEZE QM @ 75° F.-250° F. @ 100-25 $\sec^{-1}$.
Figure 19:
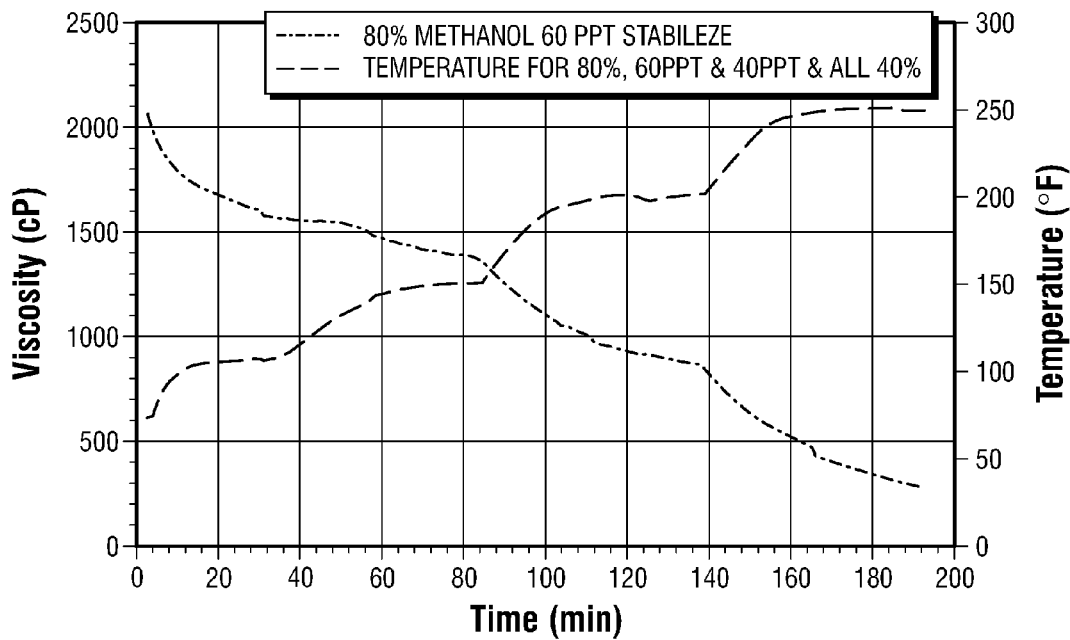
FIG. 19 shows a graph of Fann 50 Results for the 80% Methanol in water solution and 60 pptg STABILEZE QM @ 75° F.-250° F. @ 100 $\sec^{-1}$.
Figure 20:
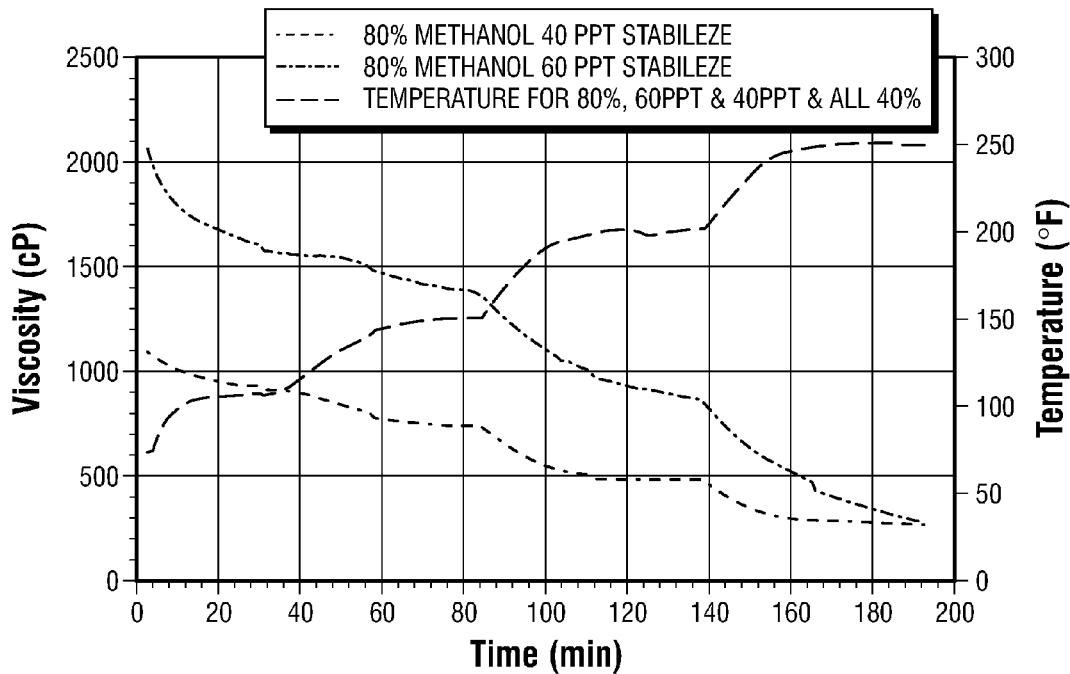
FIG. 20 shows a graph of Fann 50 Results for the 80% Methanol Tests with 60 pptg and 40 pptg STABILEZE QM @ 75° F.-250° F. @ 100 $\sec^{-1}$.
Figures 21, 22:
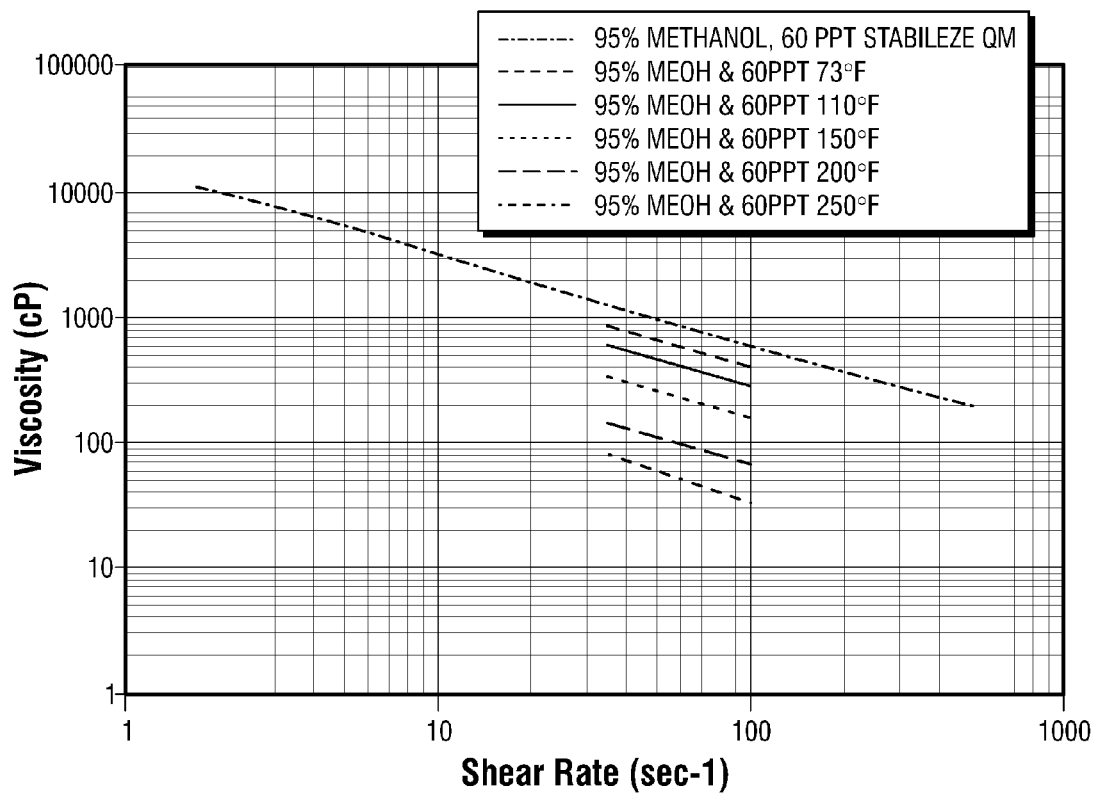
FIG. 21 shows a table of Fann 50 Viscosity Data for 95% Methanol in water solution and 60 pptg STABILEZE QM @ 75° F.-250° F. and 100-25 $\sec^{-1}$.
FIG. 22 shows a graph of Fann 50 Results for the 95% Methanol Tests with 60 pptg STABILEZE QM @ 75° F.-250° F. @ 100-25 $\sec^{-1}$.

Temperature was increased from about 75° F., to 110° F., to 150° F., to 200° F., to 250° F. every thirty minutes and a Shear Ramp from about 100, 75, 50, 25 sec-1 for every temperature. The results for formula B1 are shown in FIG. 14, FIG. 15 and FIG. 16. The results for formula B2 are shown in FIG. 17, FIG. 18 and FIG. 19. FIG. 20 shows the FIG. 16 and FIG. 19 data combined. The results for B3 are shown in FIG. 21 and FIG. 22.

Figure 25:
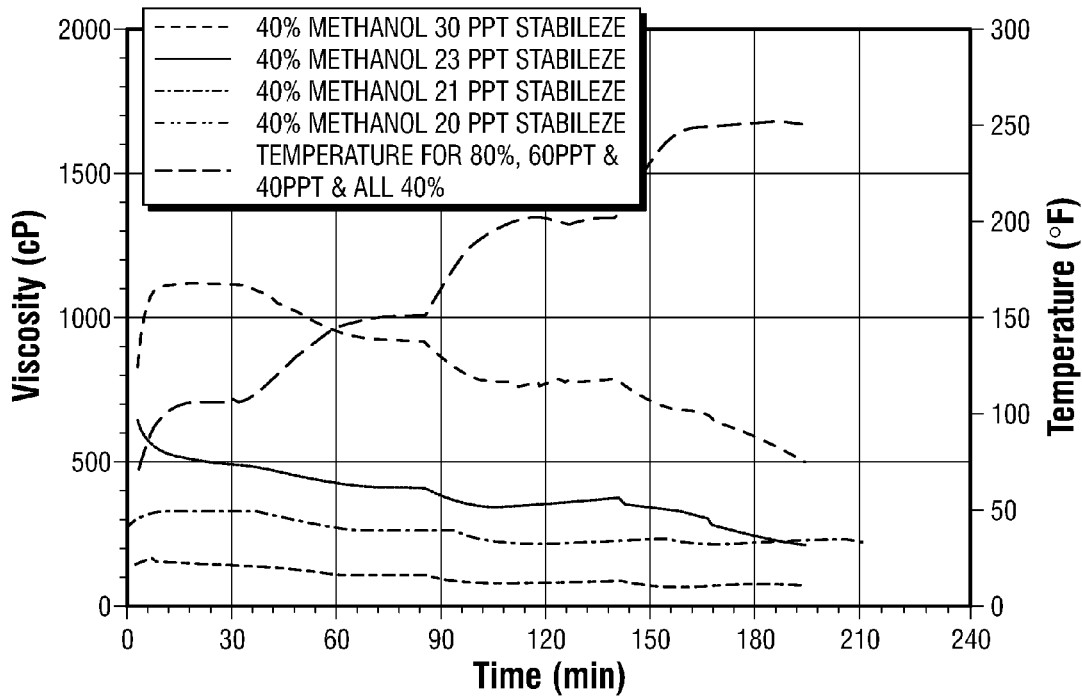
FIG. 25 shows a graph of Fann 50 Results for 40% Methanol and 20-30 pptg STABILEZE QM Tests @ 75° F.-250° F. at 100 $\sec^{-1}$.

C. Fann 50 Tests were carried out with Shear Ramps (about 100, 75, 50, 25 sec-1) and Temp Ramps (about 75° F.-250° F.) using the Caustic method of fluid preparation. The formulations were made with 40% Methanol and 20, 21, 23, and 30 pptg STABILEZE QM mixtures @ 75° F.-250° F. These results are shown in FIG. 25.

Figure 26:
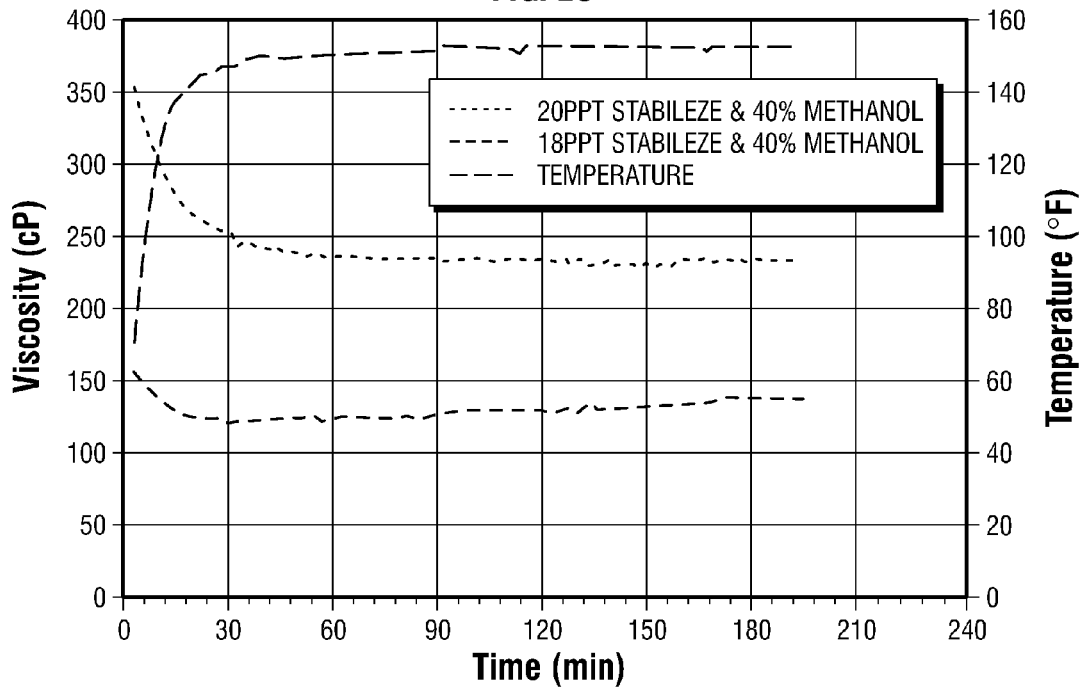
FIG. 26 shows a graph of Fann 50 Test Results for the 40% Methanol and 18-20 pptg STABILEZE QM @ 150° F. and 100 $\sec^{-1}$.
Figure 27:
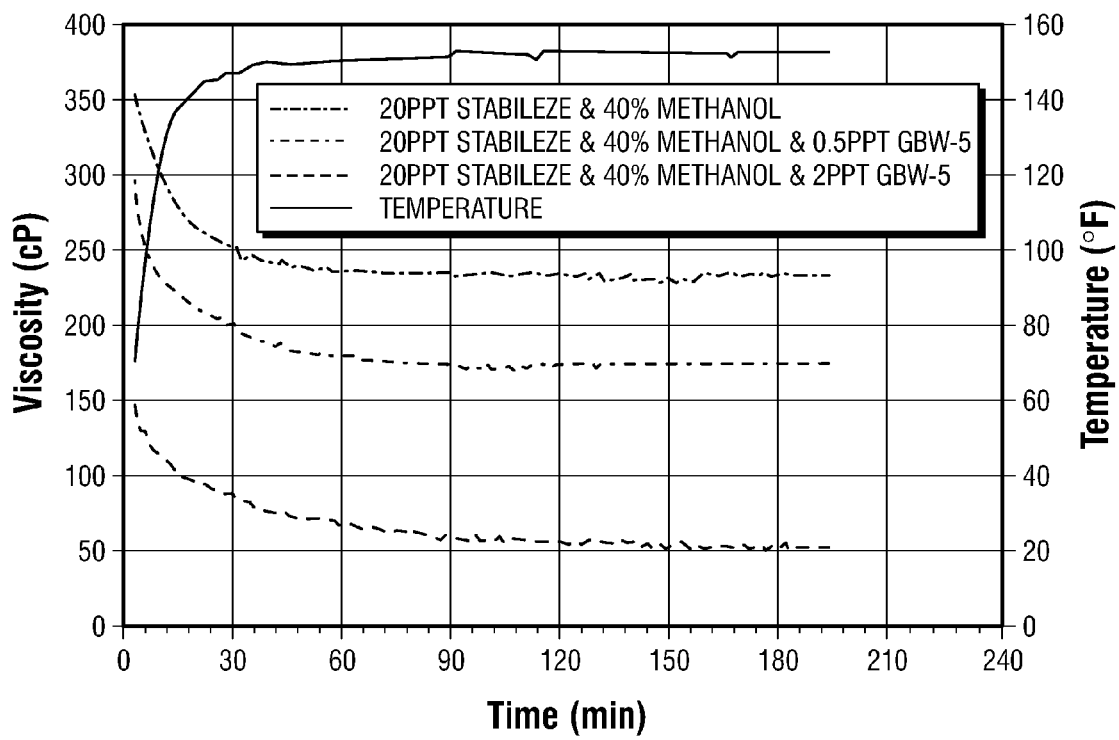
FIG. 27 shows a graph of Fann 50 Breaker Test Results for the 40% Methanol and 20 pptg STABILEZE QM and various loadings of GBW-5 breaker @ 150° F. and 100 $\sec^{-1}$.

D. Fann 50 Tests were carried out at 150° F. for formulations made with 40% Methanol and 18 pptg and 20 pptg STABILEZE QM to form two separate mixtures. The mixtures were run for three hours @ 150° F. @ 100 sec-1. The results are shown in FIG. 26. Two additional formulations were made with 40% Methanol and 20 pptg STABILEZE QM. To the first was added 0.5 pptg of GBW-5 breaker (ammonium persulfate), and to the second was added 2 pptg of GBW-5 breaker. These formulations were run for three hours @ 150° F. @ 100 sec-1. The results are shown in FIG. 27, along with the results for the 20 pptg STABILIZE QM formulation without GBW-5 breaker.

Figure 28:
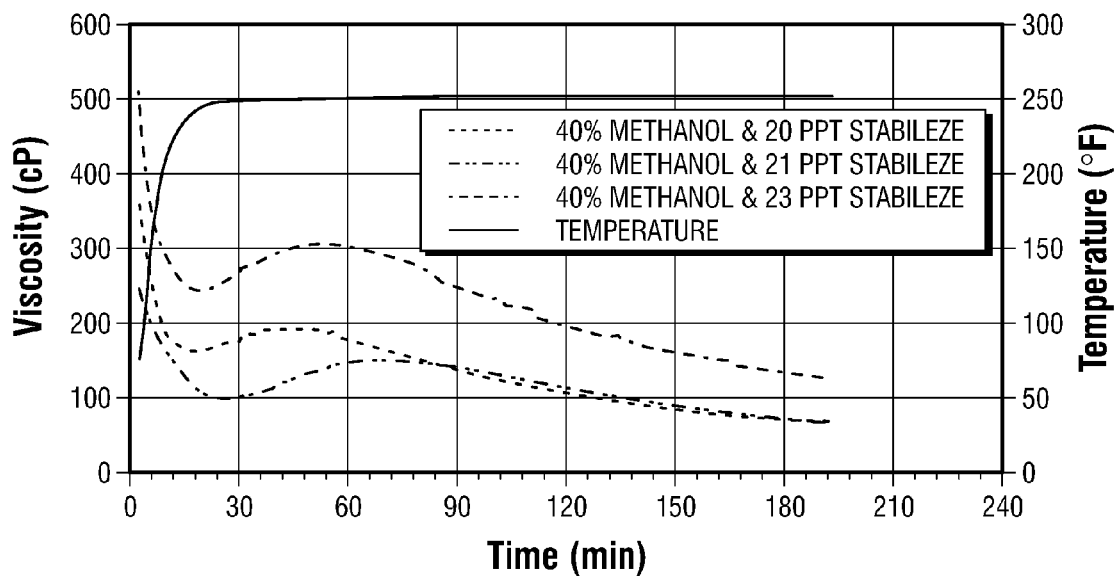
FIG. 28 shows a graph of Fann 50 Test Results for the 40% Methanol in water solution and 20-23 pptg STABILEZE QM @ 250 F and 100 sec$^{-1}$.

E. Fann 50 Tests were run at 250° F. The formulations were made with 40% Methanol and 20, 21 and 23 pptg STABILEZE QM @ 250° F. and 100 sec-1. The results are shown in FIG. 28.

Figures 29, 30:
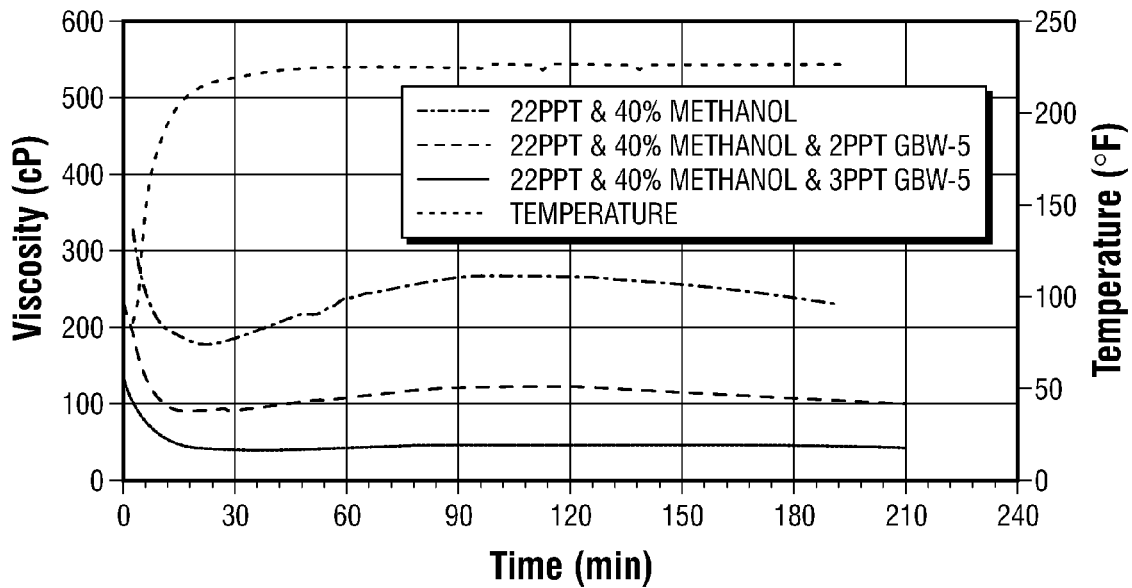
FIG. 29 shows a graph of Fann 50 Breaker Test Results for the 40% Methanol, 22 pptg STABILEZE QM, and various loadings of GBW-5 breaker @ 225° F. and 100 sec$^{-1}$.
FIG. 30 shows a table of OFITE M900 Viscosity Data for 2% STABILEZE QM in 10.8 ppg Na/K Formate Brine at 75° F. and 107° F. @1.7-1020 sec$^{-1}$.

F. Fann 50 Tests were run at 225° F. Three formulations were made with 40% Methanol and 22 pptg STABILEZE QM. To two of the formulations was added 2 and 3 pptg GBW-5 breaker @ 225° F. and 100 sec-1. These results are shown in FIG. 29, along with the results for the 22 pptg STABILIZE QM formulation without GBW-5 breaker.

Figure 45:
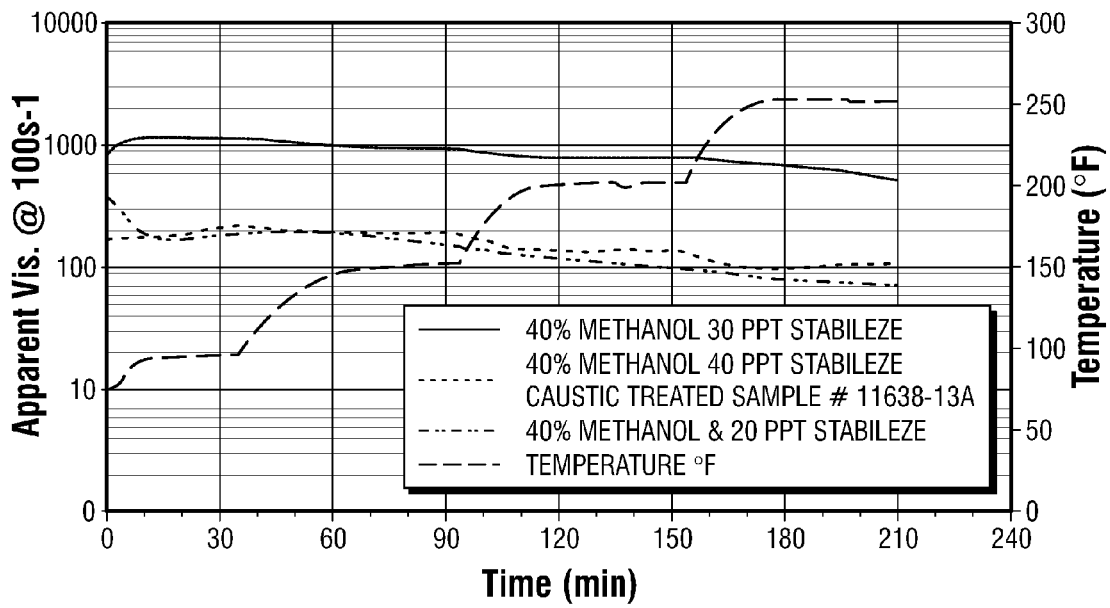
FIG. 45 shows a graph of Caustic Treated STABILEZE QM Data.

G. Fann 50 Tests were run with Shear Ramps (about 100, 75, 50, 25) and Temp Ramps (about 75-250° F.). The formulations were prepared using the Caustic Method described above. Two formulations were made using 40% Methanol and 20 pptg and 30 pptg STABILEZE QM @ 100° F.-250° F. increasing the temperature 50 degrees every thirty minutes. A formulation was also made using 40% Methanol and 40 pptg of caustic treated STABILEZE QM 40 from ISP. These results are shown in FIG. 45.

Figure 46:
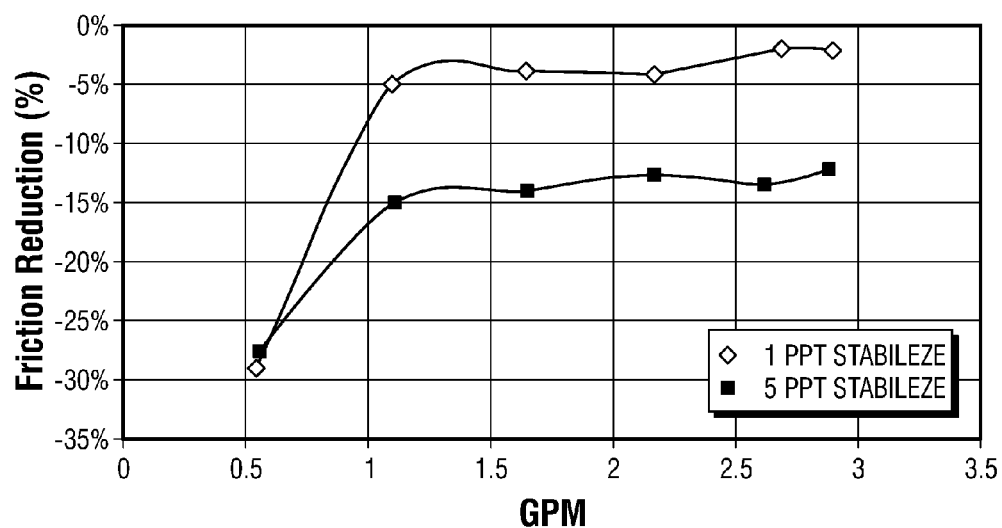
FIG. 46 shows a graph of 1 pptg and 5 pptg STABILEZE QM in 40% Methanol Friction Data.

H. Friction Tests were also carried out. The friction tests employed a mixture of 40% Methanol, 1 pptg and 5 pptg STABILEZE QM that were prepared at 75° F. using the Caustic Method described above. These results are shown in FIG. 46.

Figures 23, 24:
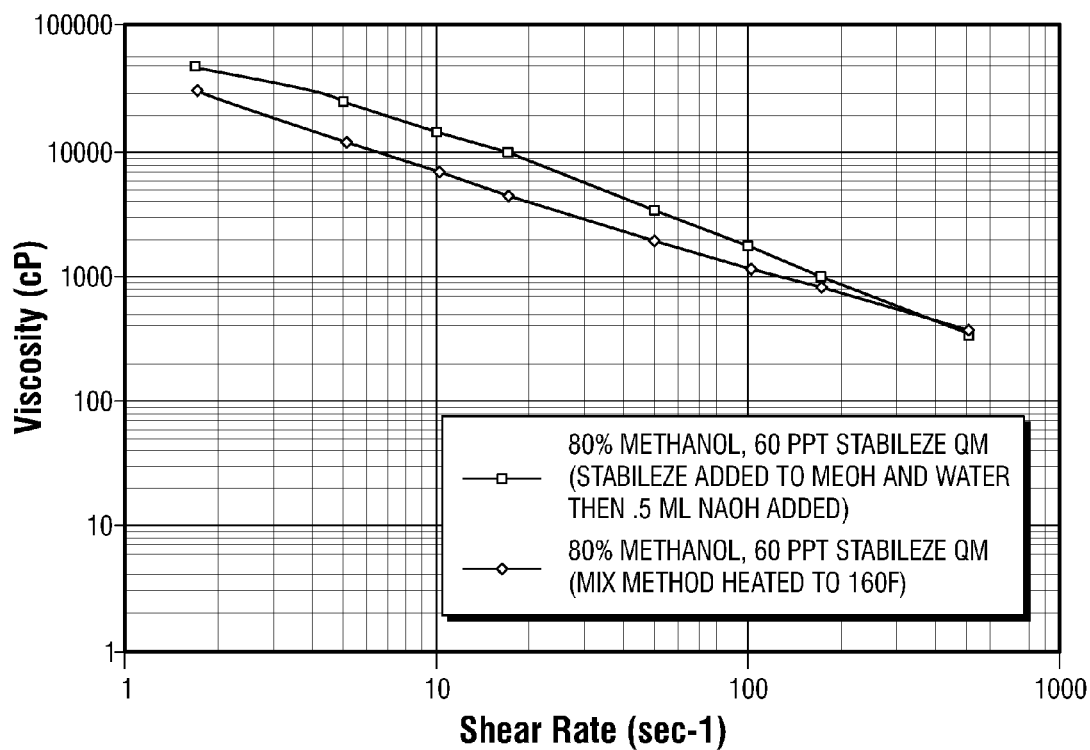
FIG. 23 shows a table of OFITE M900 Viscosity Data for 80% Methanol in water solution and 60 pptg STABILEZE QM @ 75° F.
FIG. 24 shows a graph of OFITE M900 Results for the 80% Methanol Tests with 60 pptg STABILEZE QM @ 75 @ 1.7-500 $\sec^{-1}$ with the two different Mixing Methods.

I. OFITE M900 Tests were performed on methanol fluids at 75° F. using the above described Caustic Method of fluid preparation. The formulations were made of 80% methanol and 60 pptg STABILEZE QM. The results are shown in FIG. 23 and FIG. 24. These test results compare to FIG. 1 and FIG. 3 tests prepared using 160° F. water mixing procedure. FIG. 24 includes FIG. 3 data.

J. OFITE M900 Tests were performed on Na/K formate, Cs/K formate and Cs formate containing fluids. The following formulations were made:

| J1. | 2% STABILEZE QM<br>10.8 ppg Na/K Formate at 75° F. and 107° F. |
|---|---|
| J2. | 2% STABILEZE QM<br>15.6 ppg Cs/K Formate at 75° F. and 107° F. |
| J3. | 2% STABILEZE QM<br>18.5 ppg Cs Formate at 75° F. and 107° F. |
| J4. | 2% STABILEZE QM<br>18.5 ppg Cs Formate at 140° F. and 180° F. |

Figures 31, 32:
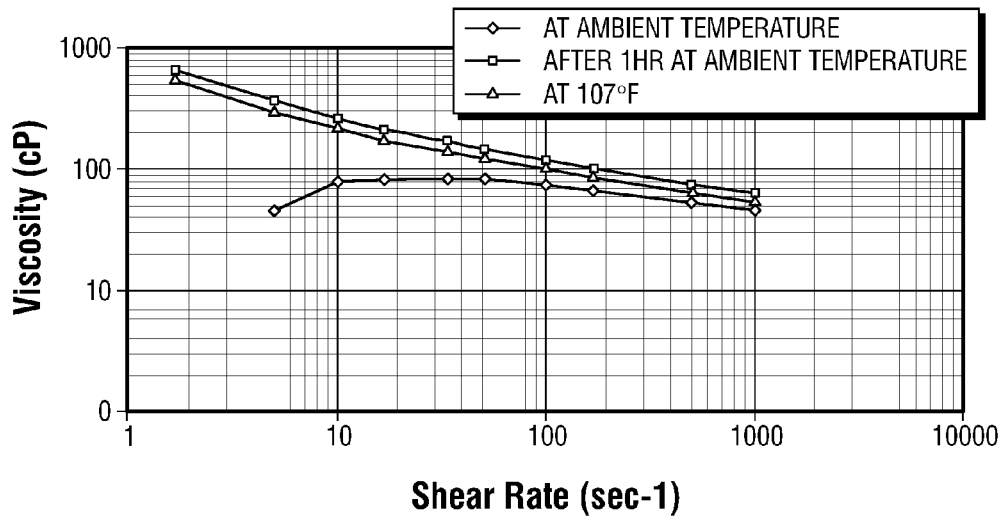
FIG. 31 shows a graph of OFITE M900 Results for 2% STABILEZE QM in 10.8 ppg Na/K Formate Brine at 75° F. and 107° F.
FIG. 32 shows a table of OFITE M900 Viscosity Data for 2% STABILEZE QM with 15.6 ppg Cesium Potassium Formate, Ambient Temperature and 107° F. @1.7-1020 sec$^{-1}$.
Figures 33, 34:
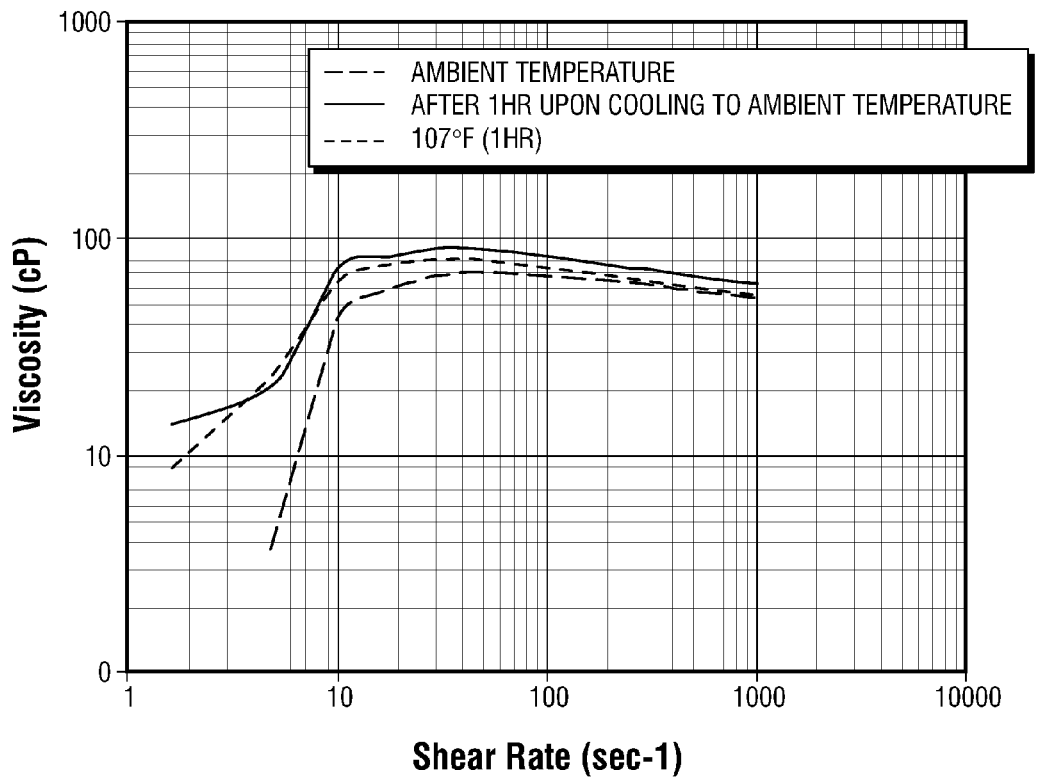
FIG. 33 shows a graph of OFITE M900 Results for 2% STABILEZE QM with 15.6 ppg Cesium Potassium Formate, Ambient Temperature and 107° F.
FIG. 34 shows a table of OFITE M900 Results for 2% STABILEZE QM with 18.5 ppg Cesium Formate at Ambient Temperature and 107° F. @1.7-1020 sec$^{-1}$.
Figures 35, 36:
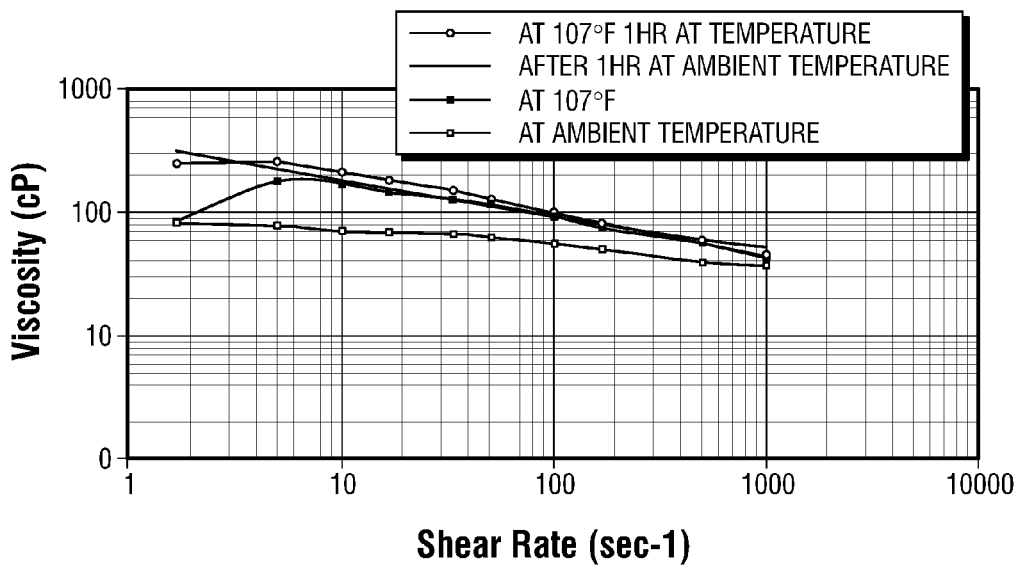
FIG. 35 shows a graph of OFITE M900 Results for 2% STABILEZE QM with 18.5 ppg Cesium Formate at Ambient Temperature and 107° F.
FIG. 36 shows a table of OFITE M900 Results for 2% STABILEZE QM in 18.5 ppg Cesium Formate at 140° F., 180° F.@1.7-1020 sec$^{-1}$.

The results for formulation J1 are shown in FIG. 30 and FIG. 31. These results for formulation J2 are shown in FIG. 32 and FIG. 33. The results for formulation J3 are shown in FIG. 34 and FIG. 35. The results for formulation J4 in FIG. 36 and FIG. 37.

K. $CO_2$ compatibility tests were carried out to determine the compatibility of STABILEZE QM with $CO_2$. The formulation used for compatibility testing was made with 60% Methanol, 40% water and 40 pptg STABILEZE QM. The test device was a Large Chamber viewing cell used to inspect foams. This cell was oriented vertically. There were 2 valves on the bottom of the viewing cell and 1 valve and a pressure regulator on the top of the viewing cell. The following steps were taken for each test: 1) A 500 mL sample of the fluid was prepared at the prescribed concentrations. 2) 300 mL of this fluid was poured into the viewing cell from the top through a funnel and the existing ½" SS (stainless steel) tubing. This filled the chamber to about 50% of its volumetric capacity. 3) The top valve and regulator were replaced. 4) $CO_2$ was then flowed from a dip (siphon) tube bottle with the flow being regulated by a $CO_2$ pressure regulator. $CO_2$ was introduced into the bottom of the cell and effectively bubbled up through the liquid fluid. The pressure on the chamber was controlled via the regulator on top of the viewing cell. 5) Observations were made looking for color changes, precipitates and solids or any other indications that would be consistent with fluid incompatibility. 6) After all observations were completed, the pressure was relieved via the top (a ventilator was used to evacuate the area of any $CO_2$). The fluid was drained out and a 250 mL sample was captured in a glass graduated cylinder, which was placed on the counter top and observed for 1 day. 7) The viewing cell was then cleaned and rinsed with substantial quantities of tap water.

Results

Results of Testing at about 75° F.—OFITE M900 Viscometer

A summary of the results of viscosity tests with 15 pptg, 20 pptg, 40 pptg and 60 pptg STABILEZE QM in 75%, 80%, 90% and 95% Methanol in Tomball tap water is shown in FIG. 1. As shown in FIG. 1, which shows viscosity data in centipoise, the viscosity of the mixtures decreases with increasing shear rate.

FIG. 2 shows the viscosity of 15 pptg, 20 pptg and 60 pptg STABILEZE QM in 75% Methanol at 75° F. in Tomball tap water. Results indicate that the viscosity of the fluid for 15 pptg, 20 pptg, and 60 pptg STABILEZE QM in 75% Methanol in Tomball tap water is 367 cP, 3185 cP and 6375 cP at 1.7 sec$^{-1}$, respectively. Results show that as the polymer concentration was increased, the viscosity of the fluid increased.

Figure 3:
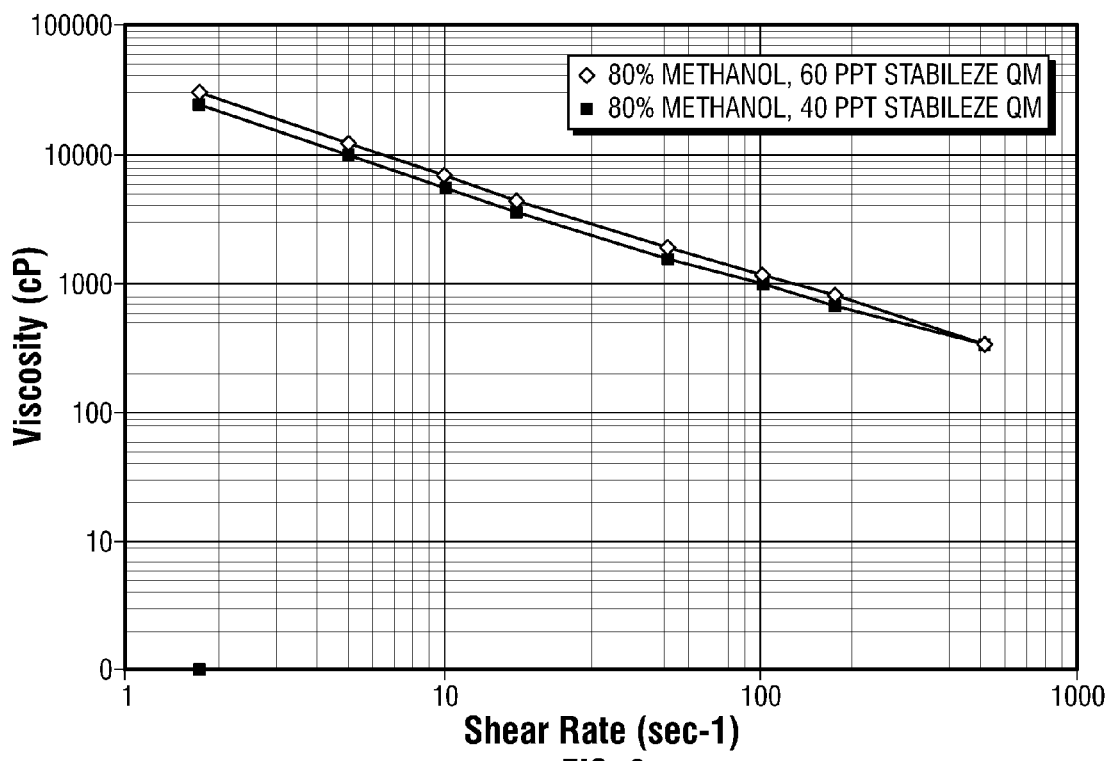
FIG. 3 shows a graph of OFITE M900 viscosity data for different concentrations of STABILEZE QM in 80% methanol in water solutions at 75 F.

FIG. 3 shows the viscosity of 40 pptg and 60 pptg STABILEZE QM in 80% Methanol at 75° F. in Tomball tap water. Results indicate that the viscosity of the fluid for 40 pptg and 60 pptg STABILEZE QM in 80% Methanol in Tomball tap water is 24500 cP and 30500 cP at 1.7 sec$^{-1}$, respectively. Results indicate that there was a slight increase as the polymer loading was increased from 40 pptg to 60 pptg.

Figure 4:
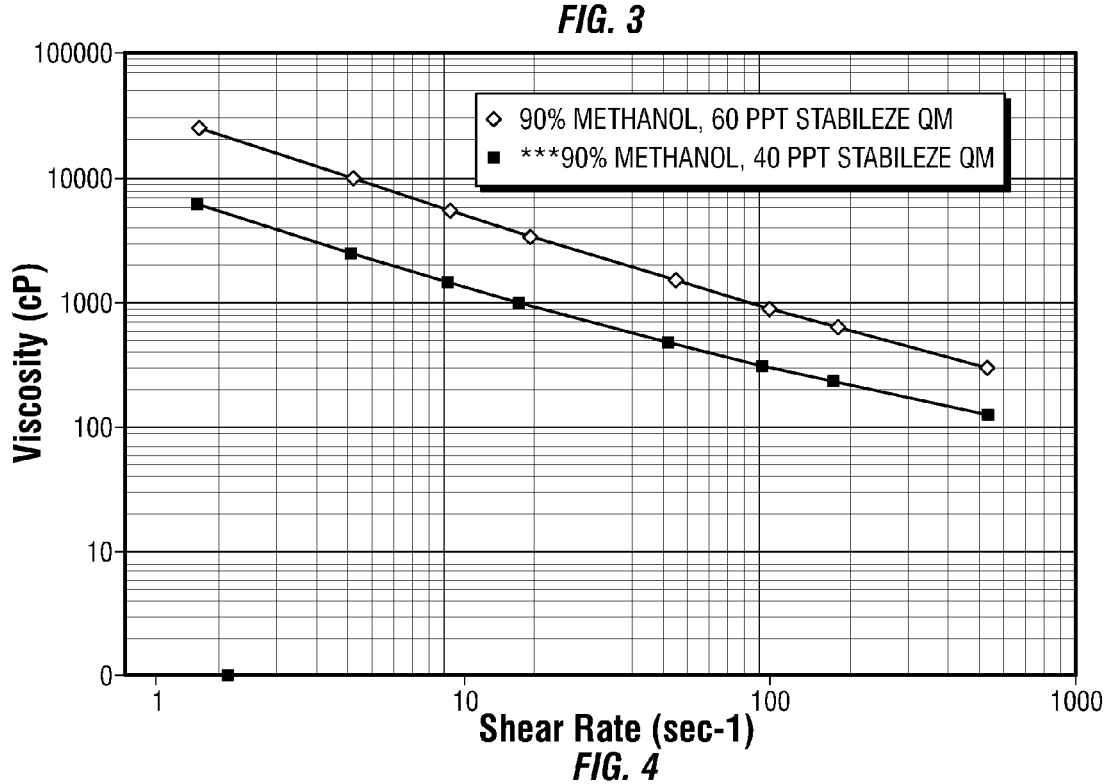
FIG. 4 shows a graph of OFITE M900 viscosity data for different concentrations of STABILEZE QM in 90% methanol in water solutions at 75 F.

FIG. 4 shows the viscosity of 40 pptg and 60 pptg STABILEZE QM in 90% Methanol at 75° F. in Tomball tap water. Results indicate that the viscosity of the fluid for 40 pptg and 60 pptg STABILEZE QM in 90% Methanol in Tomball tap water is 5911 and 24900 cP at 1.7 sec$^{-1}$, respectively. These results indicate that the STABILEZE QM, at the 40 pptg loading, loses significant viscosity when the Methanol concentration is increased from 80% to 90% Methanol. However, the STABILEZE QM, at the 60 pptg loading, loses a relatively small amount of viscosity when the Methanol concentration is increased from 80% to 90% Methanol.

Figure 5:
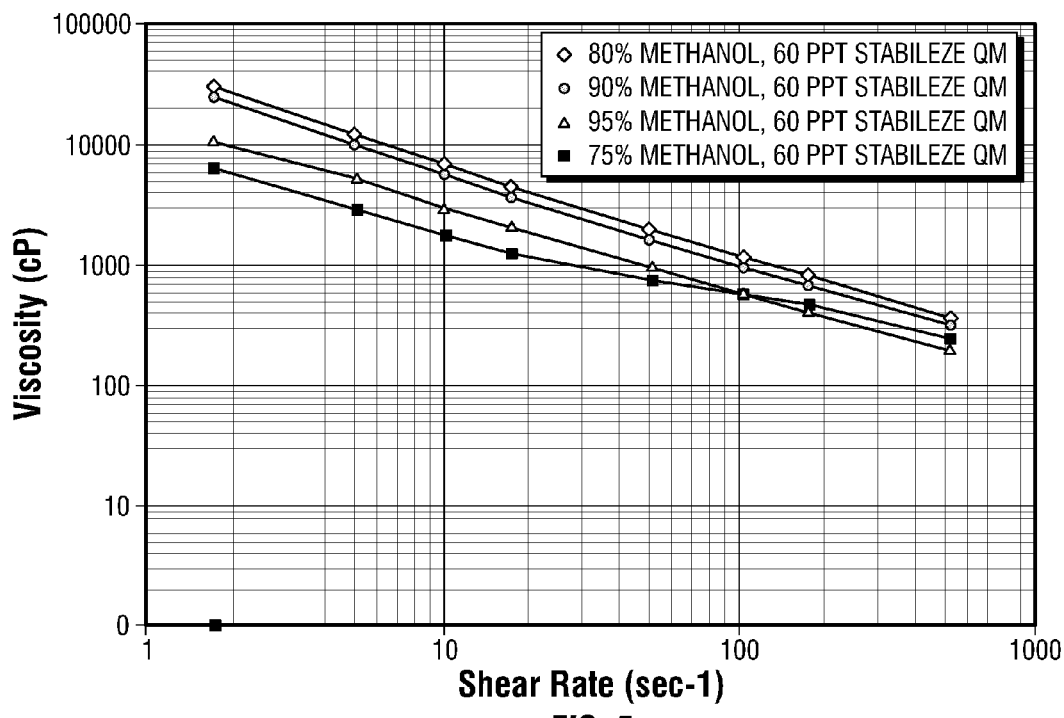
FIG. 5 shows a graph of OFITE M900 Results Comparing viscosity of Methanol/Water Solutions with 60 pptg STABILEZE QM.

FIG. 5 shows the viscosity of 60 pt STABILEZE QM in 75%, 80%, 90% and 95% Methanol at 75° F. in Tomball tap water. Results indicate that the viscosity of the fluid for 60 pptg STABILEZE QM in 75%, 80%, 90% and 95% Methanol in Tomball tap water is 6375, 30500, 24900 and 10300 cP at 1.7 sec$^{-1}$, respectively. Results indicate that the viscosity increases as the Methanol content increases from 75% to 80%, decreases slightly from 80% to 90% and significantly decreases as the Methanol content increases from 90% to 95%.

Figure 6:
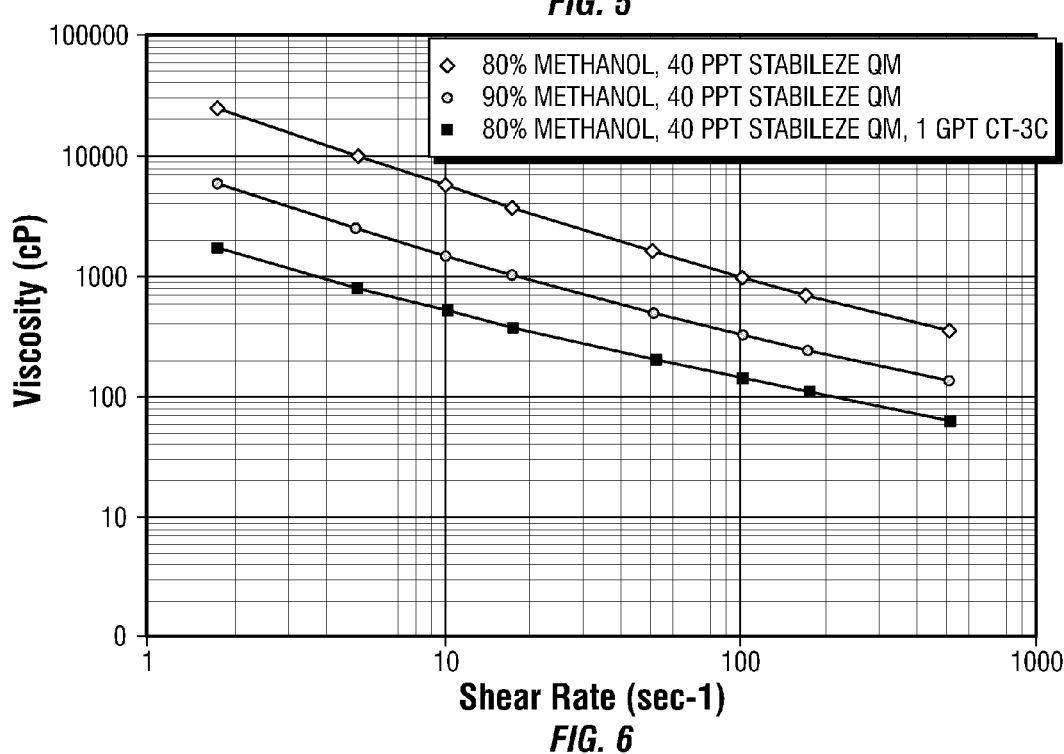
FIG. 6 shows a graph of OFITE M900 Results Comparing viscosity of Methanol/Water Solutions with 40 pptg STABILEZE QM.

FIG. 6 shows the viscosity of 40 pptg STABILEZE QM in 80% and 90% Methanol at 75° F. in Tomball tap water. Results indicate that the viscosity of the fluid for 40 pptg STABILEZE QM in 80% and 90% Methanol in Tomball tap water is 24500 cP and 5911 cP at 1.7 sec$^{-1}$, respectively. These results again indicate that the STABILEZE QM, at 40 pptg loading, loses viscosity when the Methanol concentration is increased from 80% to 90% Methanol. Results also show that the viscosity decrease, with decrease in Methanol content, is significantly greater with lower polymer concentration—40 pptg vs. 60 pptg. Results also indicate that the addition of 1 gpt Clay Treat-3C to 40 pptg STABILEZE QM in 80% Methanol in Tomball tap water significantly reduces the viscosity of the fluid.

Figure 7:
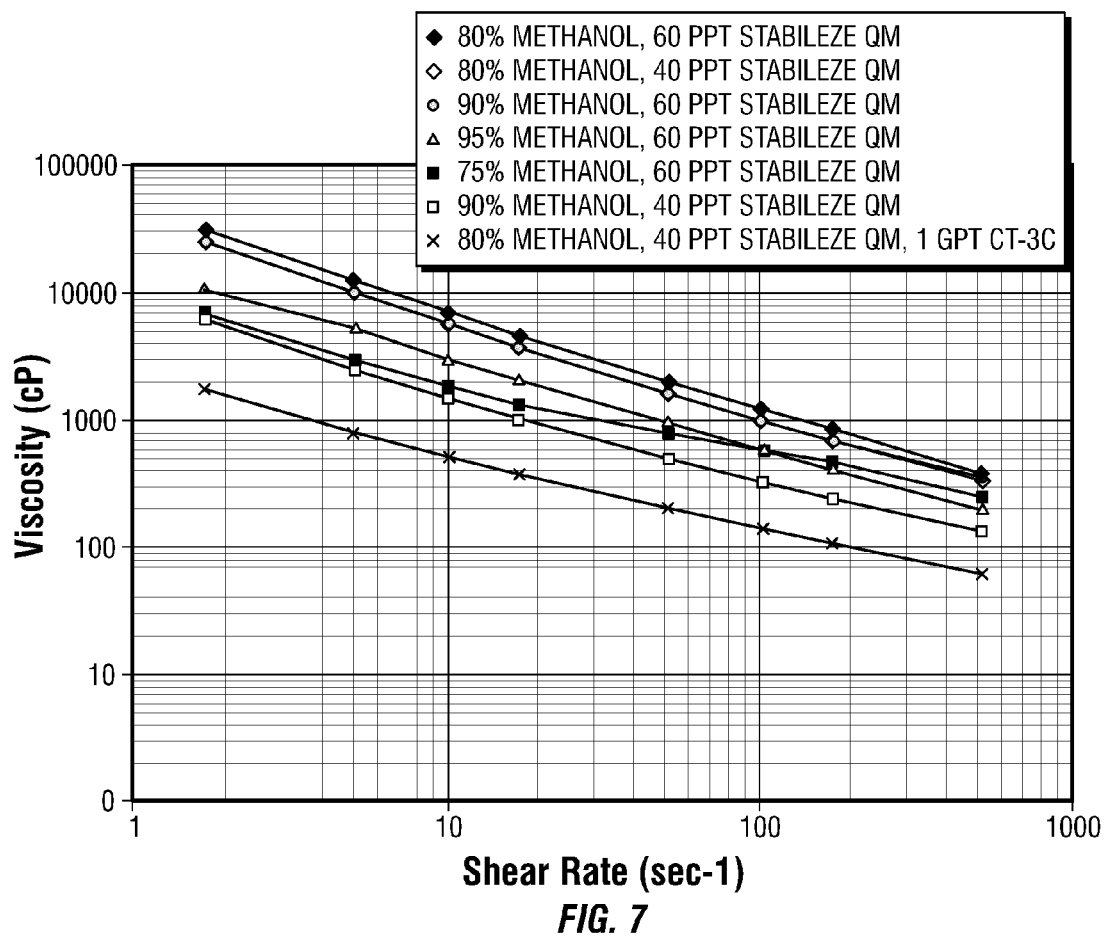
FIG. 7 shows a graph of OFITE M900 Results Comparing Viscosity of all Methanol/Water Solutions with 40 and 60 pptg STABILEZE QM.
Figure 8:
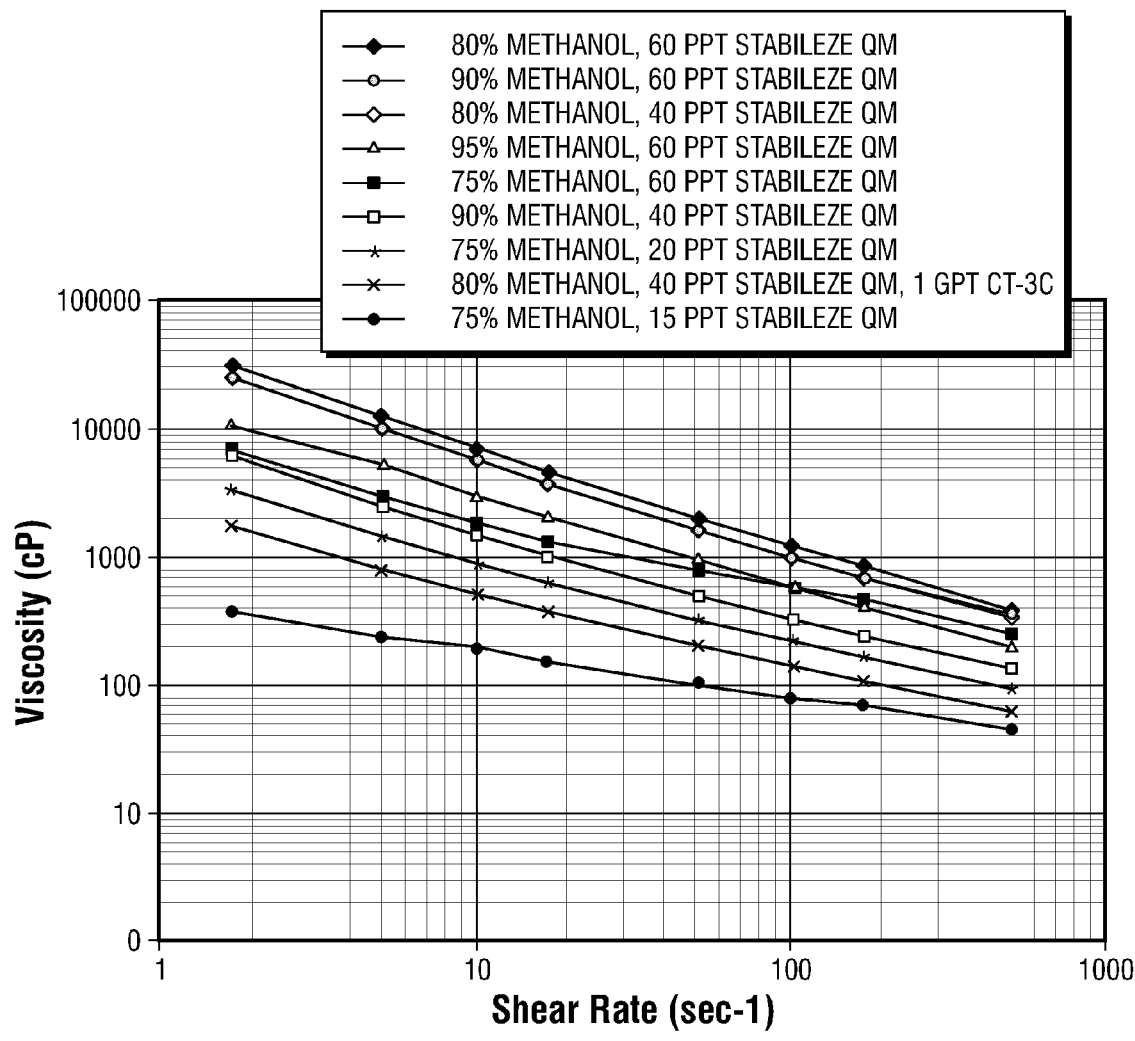
FIG. 8 shows a graph of OFITE M900 Results for Viscosity of all OFITE Tests Run with any Formulation of Methanol, Water, and STABILEZE QM.

FIGS. 7 and 8 show a summary of all the fluids tested.

Results of Testing at about 90° F.-150° F.—Fann 50 Data

Figures 9, 10:
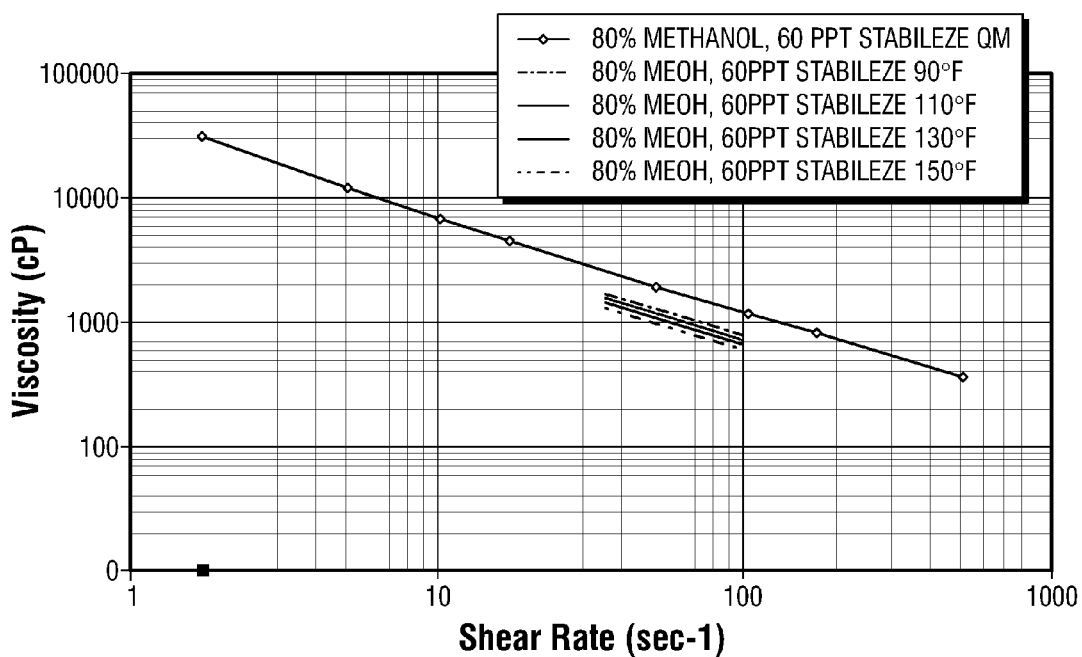
FIG. 9 shows a table of Fann 50 viscosity Data for 80% Methanol in water solution and 60 pptg STABILEZE QM @ 90° F.-150° F. and 100-25 $\sec^{-1}$.
FIG. 10 shows a graph of Fann 50 viscosity Data for 80% Methanol in water solution and 60 pptg STABILEZE QM @ 90° F.-150° F. and 100-25 $\sec^{-1}$.

Results of viscosity tests at 90° F.-150° F. with 60 pptg STABILEZE QM in 80% Methanol in Tomball tap water are shown in FIG. 9 and FIG. 10. Results indicate that the fluid shows a slow reduction in viscosity with temperature. The viscosity of the fluid at 90° F., 110° F., 130° F., and 150° F. was 779, 713, 650 and 586 cP at 100 sec$^{-1}$, respectively.

Results of viscosity tests at 90° F.-150° F. with 60 pptg STABILEZE QM in 90% Methanol in Tomball tap water are shown in FIG. 11 and FIG. 12. Results indicate that the fluid shows a slow reduction in viscosity with temperature. The viscosity of the fluid at 90° F., 110° F., 130° F., and 150° F. was 820, 775, 656 and 559 cP at 100 sec$^{-1}$, respectively. Fann 50 results from 90° F.-150° F. showed the 80% and 90% Methanol fluid with 60 pptg STABILEZE QM had similar viscosity. FIG. 13 shows a summary of data shown in FIGS. 10 and 12.

Results of Testing at about 75° F.-250° F.—Fann 50 Data

Results of viscosity tests at 72° F.-250° F. with 40 pptg STABILEZE QM in 80% Methanol in Tomball tap water are shown in FIG. 14, FIG. 15 and FIG. 16. Results indicate that the fluid shows a reduction in viscosity with temperature. The viscosity of the fluid at 72° F., 110° F., 150° F., 200° F., and 250° F. was 1119, 958, 753, 515 and 305 cP at about 100 sec$^{-1}$, respectively.

Results of viscosity tests at 72° F.-250° F. with 60 pptg STABILEZE QM in 80% Methanol in Tomball tap water are shown in FIG. 17, FIG. 18 and FIG. 19. Results indicate that the fluid shows a reduction in viscosity with temperature. The viscosity of the fluid at 72° F., 110° F., 150° F., 200° F., and 250° F. was 2055, 1598, 1372, 988 and 455 cP at 100 sec$^{-1}$, respectively.

FIG. 20 shows a summary of data from FIG. 16 and FIG. 19.

Results of viscosity tests at 72° F.-250° F. with 60 pptg STABILEZE QM in 95% Methanol in Tomball tap water are in FIG. 21 and FIG. 22. Results indicate that the fluid shows much less viscosity than the 80% Methanol fluid and a significant reduction in viscosity with temperature. The viscosity of the fluid at 72° F., 110° F., 150° F., 200° F., and 250° F. is 402, 280, 159, 67 and 33 cP at 100 sec$^{-1}$, respectively. Results also indicate that the viscosity of the fluid decreases significantly when the Methanol content is increased from 80% to 95%.

Results of OFITE M900 Testing at about 75° F. —Compare Heated to 160° F. Procedure and Caustic Addition Mixing Procedure During the course of the testing, it was determined that the STABILEZE QM solutions could be more easily mixed by mixing STABILEZE QM in the Methanol water solution and adding caustic (NaOH) to the fluid to gel. Testing shown in FIG. 23 and FIG. 24 shows the comparison of the viscosity of a 60 pptg STABILEZE QM in 80% Methanol solution prepared using both mixing procedures. Results indicate that the fluid prepared without heating showed higher viscosity at about 75° F.

Results of Testing at about 75° F.-250° F.—Fann 50 Data

Results of Fann 50 tests with 20, 21, 23 and 30 pptg STABILEZE QM in 40% Methanol are shown in FIG. 25. Results indicate that the viscosity at 150° F. for 20, 21, 23, and 30 pptg STABILEZE QM in 40% Methanol was 103, 256, 408 and 917 cP at 100 sec$^{-1}$, respectively. Results indicate that the viscosity at 250° F. with 20, 21, 23 and 30 pptg STABILEZE QM in 40% Methanol was 71, 227, 208 and 587 cP at 100 sec$^{-1}$, respectively.

Results of Fann 50 tests with 18 and 20 pptg STABILEZE QM in 40% Methanol at 150° F. show that the fluids had 137 and 232 cP at 100 sec$^{-1}$, respectively, after three hours at 150° F. Results are shown in FIG. 26. It is noted that 20 pptg data in FIG. 25 is higher than FIG. 24 data. This could be due to a slight concentration difference or temperature heat rate difference. Based on viscosity data at other polymer concentrations, the correct viscosity is probably 232 cP at 100 sec$^{-1}$.

Results of Fann 50 breaker tests with 20 pptg STABILEZE QM in 40% Methanol with 0, 0.5 and 2 pptg GBW-5 show that the fluids had 232, 175 and 51 cP at 100 sec$^{-1}$, respectively, after three hours at 150° F. Results indicate that the breaker reduced the viscosity of the fluid as the fluid was heating to temperature, but showed very minimal viscosity reduction for the remainder of the test. Results are shown in FIG. 27.

Results of Fann 50 tests with 20, 21 and 23 pptg STABILEZE QM in 40% Methanol show that the fluids had 68, 68 and 126 cP at 100 sec', respectively, after three hours at 250° F. Results are shown in FIG. 28.

Results of Fann 50 breaker tests with 22 pptg STABILEZE QM in 40% Methanol with 0, 2 and 3 pptg GBW-5 show that the fluids had 230, 103 and 44 cP at 100 sec$^{-1}$, respectively, after three hours at 225° F. Results again indicate that the breaker reduced the viscosity of the fluid as the fluid was heating to temperature, but showed very minimal viscosity reduction for the remainder of the test. Results are shown in FIG. 29.

Results of Testing at about 75° F.-180° F. —OFITE M900 Data—Formate Based Fluids Results of 2% STABILEZE QM testing in sodium/potassium formate, cesium/potassium formate and cesium formate fluids are shown in FIGS. 30-37.

Results of testing in 10.8 ppg sodium/potassium formate indicate that, when completely mixed, the 2% STABILEZE QM in 10.8 ppg Na/K brine has comparable viscosity at 75° F. and at 107° F. The fluids have approximately 100-110 cP at 100 sec$^{-1}$. The STABILEZE QM continues to solubilize with time and temperature.

Results of testing in 15.6 ppg cesium/potassium formate indicate that, when completely mixed, the 2% STABILEZE QM in 15.6 ppg Cs/K brine has comparable viscosity at 75° F. and at 107° F. The fluids have approximately 65 cP at 100 sec$^{-1}$. The viscosity of the 2% STABILEZE QM in 15.6 ppg Cs/K brine increases with temperature. The viscosity of the 2% STABILEZE QM in 18.5 ppg Cesium Formate brine at 75° F., 107° F., 140° F. and 180° F. is 89, 98, 183, and 387 cP at 100 sec$^{-1}$, respectively. The viscosity of the 2% STABILEZE QM in 18.5 ppg in Cesium Formate brine at 75° F., 107° F., 140° F. and 180° F. is 309, 250, greater than 875, and 5605 cP at 1.7 sec$^{-1}$, respectively.

The two pre-neutralized STABILIZE QM powder products (caustic treated STABILIZE and caustic and quat treated STABILIZE 11638-61) from ISP were tested. Neither product gelled in 40% or 80% Methanol. The caustic treated STABILIZE in a 40% Methanol solution was very chunky, and most of the powder did not dissolve, instead it clumped up. The fluid was run on the Fann 50, and data is shown in FIG. 45 below. The caustic treated STABILIZE QM did form a thick gel, when mixed in water, but not all the powder completely dissolved.

CO$_2$ Compatibility Test Results

Results of CO$_2$ compatibility testing of 60% Methanol, 40% water and 40 pptg STABILEZE QM showed that the fluid appeared to be compatible with CO$_2$. The test procedure is detailed above.

Friction Pressure Test Results

Results of friction pressure testing of 1 pptg and 5 pptg STABILEZE QM in 40% Methanol and 60% water, shown in FIG. 46, indicated that 1 pptg STABILEZE QM in 40% Methanol shows no friction reduction. Increasing the STABILEZE QM concentration to 5 pptg actually shows a friction pressure increase.

Conclusions:

The STABILEZE QM was mixed in Methanol solutions by adding the STABILEZE QM to the Methanol-water mixture and neutralizing to pH 7 with 25% sodium hydroxide. As the sodium hydroxide was added, the fluid gelled.

Results indicate that as the polymer concentration increases from 15 to 60 pptg the viscosity of the fluid increased.

The fluid viscosity for 15 pptg, 20 pptg, and 60 pptg STABILEZE QM in 75% Methanol in Tomball tap water was 367, 3185 and 6375 cP at 1.7 sec-1, respectively. Results indicate that as the polymer concentration increases the viscosity of the fluid increases.

The fluid viscosity for 40 pptg and 60 pptg STABILEZE QM in 80% Methanol in Tomball tap water is 24500 and 30500 cP at 1.7 sec-1, respectively. STABILEZE QM, at the 40 pptg loading, loses significant viscosity when the Methanol concentration is increased from 80% to 90% Methanol. The STABILEZE QM, at the 60 pptg loading, loses only minimal viscosity when the Methanol concentration is increased from 80% to 90% Methanol.

The viscosity of the 60 pptg STABILEZE QM in 75%, 80%, 90% and 95% Methanol in Tomball tap water is 6375, 30500, 24900 and 10300 cP at 1.7 sec-1, respectively. The viscosity increases as the Methanol content increases from 75% to 80%, decreases slightly from 80% to 90% and significantly decreases as the Methanol content increases from 90% to 95%.

The addition of Clay Treat-3C does significantly reduce the viscosity of STABILEZE QM Methanol fluids.

Fann 50 results from 90° F.-150° F. show the 80% and 90% Methanol fluid with 60 pptg STABILEZE QM has similar viscosity. The viscosity of the 80% Methanol fluid with 60 pptg STABILEZE QM at 90° F.-150° F. decreases from 780 to 586 cP at 100 sec$^{-1}$.

The viscosity of the 80% Methanol fluid with 60 pptg STABILEZE QM at 72° F.-250° F. decreases from 2055 to 455 cP at 100 sec$^{-1}$. The viscosity significantly decreases as the Methanol content increases from 80% to 95% (note that no 90% tests were done). The viscosity of the 60 pptg STABILEZE QM in 95% Methanol fluid at 72° F.-250° F. decreases from 402 to 33 cP at 100 sec$^{-1}$.

Breaker tests with 18 and 20 pptg STABILEZE QM in 40% Methanol with 0, 0.5 and 2 pptg GBW-5 breaker show that the fluids had 232, 175 and 51 cP at 100 sec-1, respectively, after three hours at 150° F. Results indicate that the breaker reduced the viscosity of the fluid as the fluid was heating to temperature, but showed very minimal viscosity reduction for the remainder of the test.

Breaker tests with 20, 21 and 23 pptg STABILEZE QM in 40% Methanol show that the fluids had 68, 68 and 126 cP at 100 sec', respectively, after three hours at 250° F.

Breaker tests with 22 pptg STABILEZE QM in 40% Methanol with 0, 2 and 3 pptg GBW-5 at 225° F. show that the fluids had 230, 103 and 44 cP at 100 sec', respectively, after three hours at 225° F. Again the breaker reduced the viscosity of the fluid as the fluid was heating to temperature, but showed very minimal viscosity reduction for the remainder of the test.

Aqueous Solvent Formulations

The following examples illustrate that STABILEZE QM from ISP can gel oilfield brines and maintain viscosity with time at temperature for possible use as gravel pack fluids.

Procedure

Fluid Viscosity Determination at about 75° F.

10.8 ppg Na/K Formate was measured into a beaker. While stirring using an overhead stirrer, the STABILEZE QM polymer was added and stirred for 10 minutes. 40 milliliters of the gelled solution was added into a closed viscometer cup. The viscosity was measured at 1, 3, 6, 10, 30, 60, 100, 300 and 600 rpm on an OFITE M900 Viscometer with R1/B1 rotor-bob configuration. This testing procedure was also used to test mixtures of 15.6 ppg Cesium/Potassium Formate and 18.5 Cesium Formate viscosified with the STABILEZE QM polymer.

Viscosification of 12 ppg Sodium Bromide was also carried out with STABILEZE QM. 12 ppg Sodium Bromide Brine was measured into a beaker. While stirring using an overhead stirrer, STABILEZE QM was added and stirred for 15 minutes. 50% NaOH was used to adjust the pH. 150 ml of the gel was transferred into an open cup and fluid viscosity was measured at ambient temperature at 1, 3, 6, 10, 20, 30, 60, 100, 300 and 600 rpm on OFITE M900 Viscometer with R1/B1 rotor bob configuration.

The viscosity testing was performed for 2% STABILEZE QM in 10.8 ppg Na/K formate, 15.6 ppg Cesium/Potassium Formate and 18.5 ppg Cesium Formate and 3% STABILEZE QM in 12 ppg Sodium bromide. The viscosity tests performed with 3% STABILEZE QM in 12 ppg Sodium Bromide were buffered to a pH of 7, 8 and 10. The fluid formulations for these tests are given in the Formulation Section below.

Stability Testing

The stability of 2% STABILEZE QM in 10.8 ppg Na/K Formate and 15.6 Cs/K Formate was tested as follows: After measuring the rheology at ambient temperature, the gel was transferred into a glass jar and heated in a pre-heated water bath for an hour at 107° F. The heating cup of the OFITE M900 Viscometer was then pre-heated to 107° F. The gel was transferred into the heating cup at 107° F. and viscosity measured at 1, 3, 6, 10, 20, 30, 60, 100, 300 and 600 rpm. The gel was cooled to room temperature and after an hour viscosity measurements were repeated.

The stability of 2% STABILEZE QM in 18.5 ppg Cs Formate was tested as follows: The gel was transferred into a glass jar and heated in a pre-heated water bath at 107° F. The heating cup of the OFITE M900 Viscometer was then pre-heated to 107° F. In 1 hour the gel was transferred into the heating cup at 107° F. and viscosity measured at 1, 3, 6, 10, 20, 30, 60, 100, 300 and 600 rpm. The gel was poured back into the glass jar and heated in a pre-heated water bath at 140° F. for an hour. The viscosity was measured again while the gel was kept in the pre-heated cup at 140° F. Now the gel was poured back into the glass jar and warmed in a pre-heated water bath at 180° F. for an hour. The viscosity was measured again while the gel was heated using the pre-heated cup at 180° F. The gel was cooled to room temperature and after an hour viscosity measurements were repeated.

The stability of 3% STABILEZE QM in 12 ppg Sodium Bromide was tested as follows: The gel was transferred into a glass jar and heated in a pre-heated water bath at 107° F. for an hour and rheology measured on OFITE M900 viscometer while keeping the gel heated in the pre-heated cup at 107° F. The gel was then transferred back into the glass jar and kept another 20 hours in water bath maintained at 107° F. Rheology measurements were repeated as before using pre-heated cup at 107° F. after 20 hours. The gel was poured back into the glass jar and heated to 140° F. in a pre-heated water bath for an hour. Rheology was measured at 1, 3, 6, 10, 20, 30, 60, 100, 300 and 600 rpm.

Fluid Formulations:

Formulation No: 1
147 ml of 10.8 ppg Sodium/Potassium Formate Brine solution
3 gm STABILEZE QM
Viscosity testing performed at 75° F. and Stability testing performed at 107° F. (see Procedure above)

Formulation No: 2
147 ml of 15.6 ppg Cesium/Potassium Formate Brine Solution
3 gm STABILEZE QM
Viscosity testing performed at 75° F. and Stability testing performed at 107° F. (See Procedure above)

Formulation No: 3
147 ml of 18.5 ppg Cesium Formate Brine Solution
3 gm STABILEZE QM
Viscosity testing performed at 75° F. and Stability testing performed at 107° F., 140° F. and 180° F.

Formulation No: 4
194 ml of 12 ppg Sodium Bromide Brine Solution
6 gm STABILEZE QM
pH 7 using 50% by weight NaOH
Viscosity testing performed at 75° F. and Stability testing performed at 107° F. (1 hour), 107° F. (20 hours) and 140° F.

Formulation No: 5
194 ml of 12 ppg Sodium Bromide Brine Solution
6 gm STABILEZE QM
pH of 8 using 50% by weight NaOH
Viscosity testing performed at 75° F., and stability testing performed at 107° F. (1 hour), 107° F. (20 hours) and 140° F.

Formulation No: 6
194 ml of 12 ppg Sodium Bromide Brine Solution
6 gm of STABILEZE QM
pH of 10 using 50% by weight NaOH Viscosity testing performed at 75° F., and stability testing performed at 107° F. (1 hour), 107° F. (20 hours) and 140° F.

Results:

Results of 2% STABILEZE QM in 10.8 Ppg Na/K Formate at about 75° F., 107° F.

The results of the viscosity testing of 2% STABILEZE QM in 10.8 ppg sodium/potassium formate at 75° F. and 107° F. are shown in FIG. 30 and FIG. 31. Results indicate that when completely mixed, the 2% STABILEZE QM in 10.8 ppg Na/K brine has comparable viscosity at 75° F. and at 107° F. The fluids have approximately 100-110 cP at 100 sec-1. The STABILEZE QM continues to solubilize with time and temperature.

Results of 2% STABILEZE QM in 15.6 Ppg Cesium/Potassium Formate

The viscosity of 2% STABILEZE QM in 15.6 ppg Cesium/Potassium Formate at 75° F. and 107° F. is shown in FIG. 32 and FIG. 33. Results indicate that when completely mixed, the 2% STABILEZE QM in 15.6 ppg cesium/potassium brine has comparable viscosity at 75° F. and at 107° F. The STABILEZE QM continues to solubilize with time and temperature.

Results of 2% STABILEZE QM in 18.5 Ppg Cesium Formate at about 75° F., 107° F., 140° F. And 180° F.

Figures 37, 38:
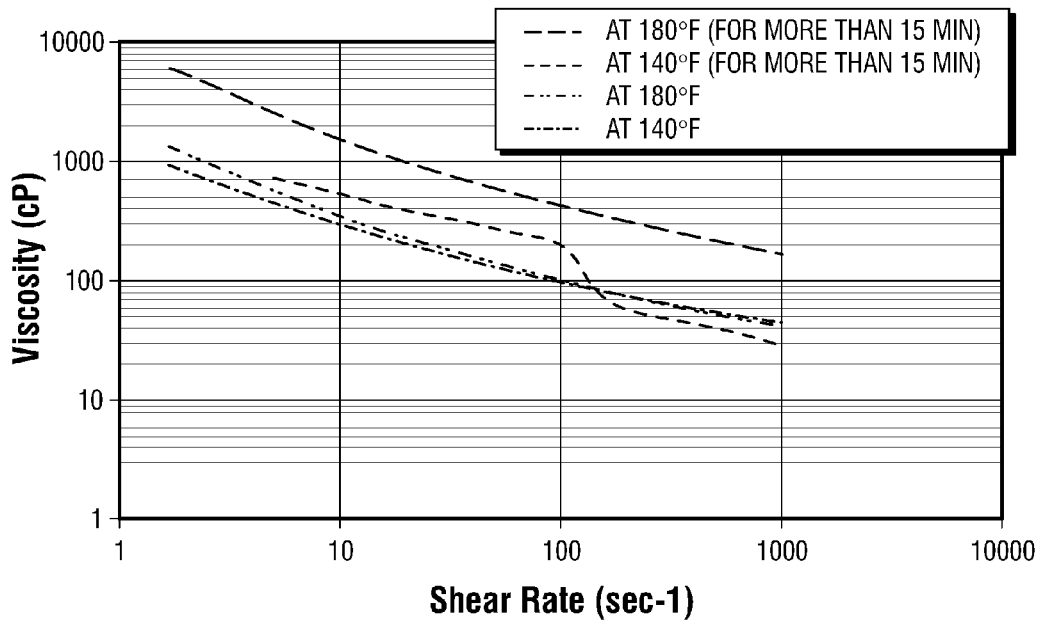
FIG. 37 shows a graph of OFITE M900 Results for 2% STABILEZE QM in 18.5 ppg Cesium Formate at 140° F., 180° F.
FIG. 38 shows a table of OFITE M900 Results for 3% STABILEZE QM with 12 ppg Sodium Bromide Brine at pH=7 at 75° F., 107° F. and 140° F.@1.7-1020 sec$^{-1}$.

Rheology of 2% STABILEZE in 18.5 ppg Cesium formate at ambient temperature and 107° F. are shown in FIG. 34 and FIG. 35. Results indicate that, when completely mixed, the 2% STABILEZE QM in 18.5 ppg Cs formate brine has comparable viscosity at 75° F. and at 107° F. The fluids have approximately 90 cP at 100 sec$^{-1}$. The viscosity of the 2% STABILEZE QM in 18.5 ppg Cs formate brine increases with temperature. The viscosity of the 2% STABILEZE QM in 18.5 ppg Cs formate brine at 75° F., 107° F., 140° F. and 180° F. is 89, 98, 183, and 387 cP at 100 sec$^{-1}$, respectively. The viscosity of the 2% STABILEZE QM in 18.5 ppg Cs formate brine at 75° F., 107° F., 140° F. and 180° F. is 309, 250, greater than 875, and 5605 cP at 1.7 sec$^{-1}$, respectively. FIG. 36 and FIG. 37 show the rheology of 2% STABILEZE QM in 18.5 ppg Cs Formate at 140° F. and 180° F.

Results of 3% STABILEZE QM in 12 Ppg Sodium Bromide Brine at about 75° F., 107° F. And 140° F.

Figures 39, 40:
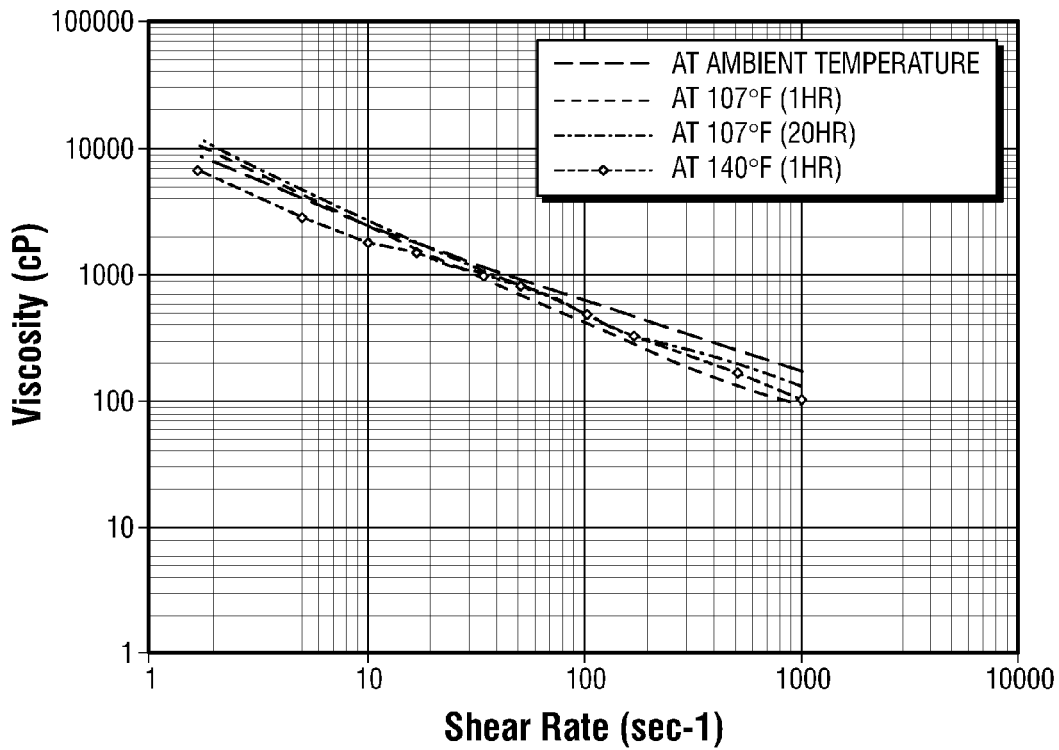
FIG. 39 shows a graph of OFITE M900 Results for 3% STABILEZE QM with 12 ppg Sodium Bromide at 75° F., 107° F. and 140° F. and at pH=7.0.
FIG. 40 shows a table of OFITE M900 Results for 3% STABILEZE QM with 12 ppg Sodium Bromide Brine at pH=8 at 75° F., 107° F. and 140° F.@1.7-1020 sec$^{-1}$.
Figures 41, 42:
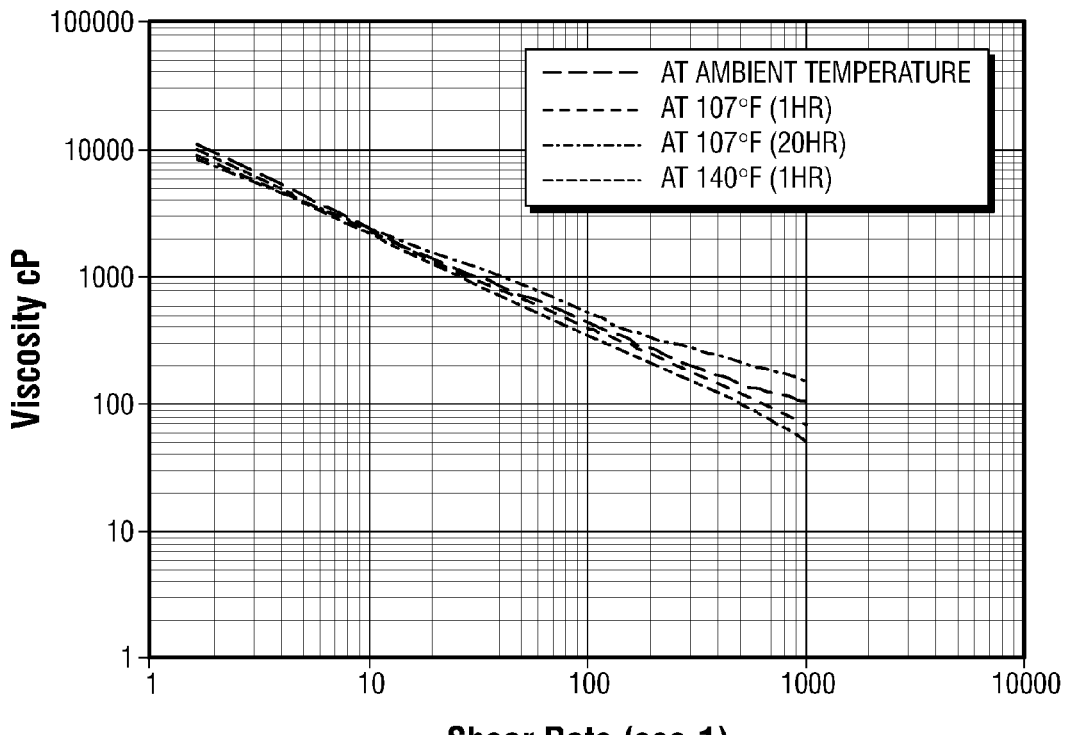
FIG. 41 shows a graph of OFITE M900 Results for 3% STABILEZE QM in 12 ppg Sodium Bromide at pH=8 at 75° F., 107° F. and 140° F.
FIG. 42 shows a table of OFITE M900 Results for 3% STABILEZE QM with 12 ppg Sodium Bromide Brine at pH=10 at 75° F., 107° F. and 140° F.@1.7-1020 sec$^{-1}$
Figure 43:
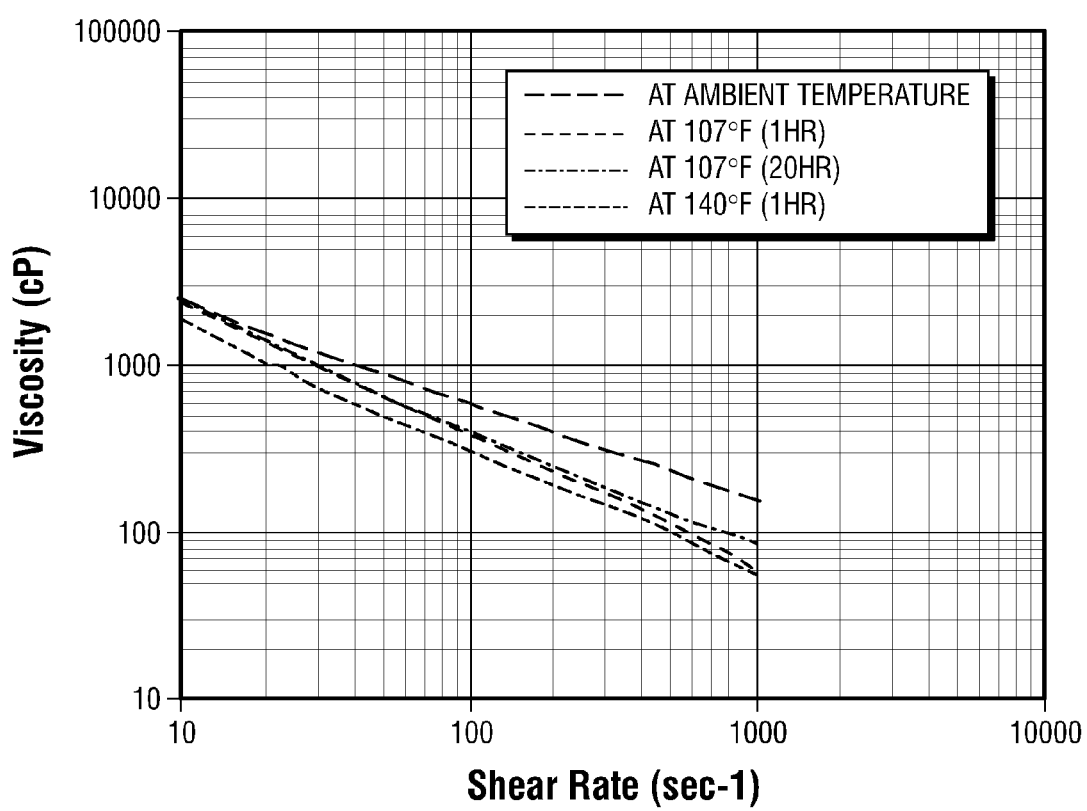
FIG. 43 shows a graph of OFITE M900 Results for 3% STABILEZE QM in 12 ppg Sodium Bromide at pH=10 at 75° F., 107° F. and 140° F.

The viscosity of 3% STABILEZE QM in 12 ppg Sodium Bromide Brine buffered to pH 7, 8 and 10 is shown in the tables of FIGS. 38, 40 and 42 and the data is plotted in FIGS. 39, 41, and 43. Results indicate that 3% STABILEZE QM in 12 ppg Sodium bromide buffered to 7 pH, the viscosity increased with temperature and time. The viscosity of the fluid at 75° F., 107° F. and 140° F. is respectively 627, 409, and 471 cP at 100 sec-1.

Rheology testing of 12 ppg Sodium Bromide Brine viscosified with 3% STABILEZE buffered to pH 8 indicates comparable viscosities at lower shear rates. The viscosity of 12 ppg sodium bromide with 3% STABILEZE QM buffered to pH 8 at 75° F., 107° F. and 140° F. is 495, 380, and 325 cP respectively at about 100 sec-1.

Viscosity of 3% STABILEZE QM in 12 ppg Sodium Bromide buffered to 10 pH at 75° F., 107° F. and 140° F. is 555, 365, and 287 cP respectively at about 100 sec-1. At higher temperatures, 12 ppg Sodium Bromide Brine viscosified with 3% STABILEZE QM at 10 pH was found to have comparable viscosity at higher shear rates.

Figure 44:
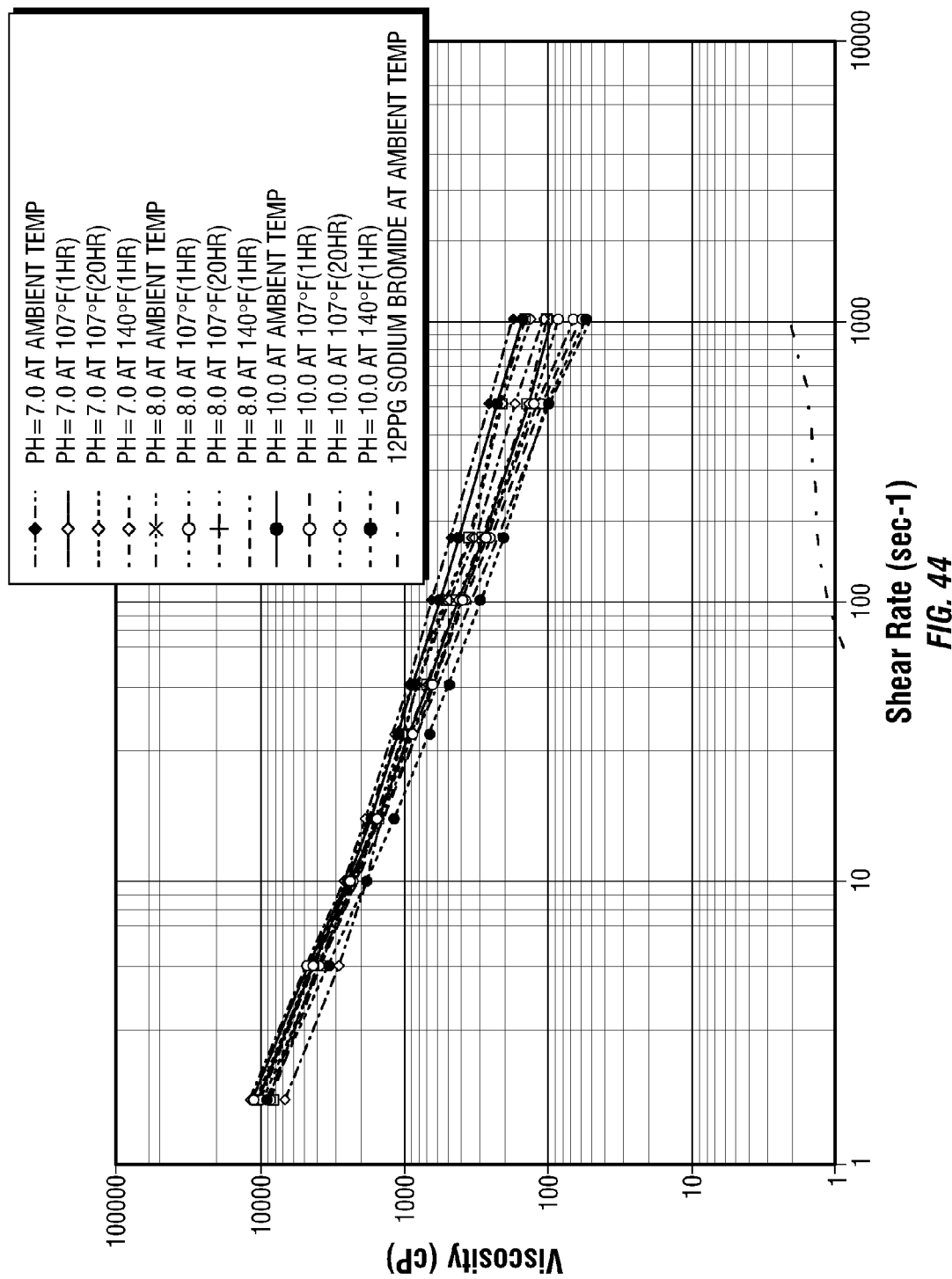
FIG. 44 shows a comparison between the rheology of 12 ppg Sodium bromide Brine viscosified with 3% STABILEZE QM at pH 7, 8 and 10 at 75° F., at 75° F., 107° F. and 140° F. (pH adjusted using 50% NaOH).

FIG. 44 shows a comparison between the rheology of 12 ppg Sodium bromide brine viscosified with 3% STABILEZE QM at a pH of 7, 8 and 10 at 75° F., 107° F. and 140° F.

CONCLUSION

The STABILEZE QM can be used to gel 10.8 ppg formate, 15.6 ppg cesium/potassium formate and 18.5 ppg cesium formate by adding the STABILEZE QM to the formates. The STABILEZE QM can be also be used to viscosify 12 ppg sodium bromide brine by adding STABILEZE QM to the brine and neutralizing to a pH ranging from about 7 to about 10 with 50% sodium hydroxide. As the sodium hydroxide is added, the fluid will gel.

Results of testing in 10.8 ppg sodium/potassium formate indicate that when completely mixed, the 2% STABILEZE QM in 10.8 ppg Na/K formate has comparable viscosity at 75° F. and at 107° F. The fluids have approximately 100-110 cP at 100 sec-1. The STABILEZE QM continues to solubilize with time and temperature.

Results indicate that when completely mixed, the 2% STABILEZE QM in 15.6 ppg cesium/potassium brine has comparable viscosity at 75° F. and at 107° F. The STABILEZE QM continues to solubilize with time and temperature. The viscosity of the 2% STABILEZE QM in 18.5 ppg Cs formate increases with temperature. The viscosity of the 2% STABILEZE QM in 18.5 ppg Cs formate at 75° F., 107° F., 140° F. and 180° F. is 89, 98, 183, and 387 cP at 100 sec-1, respectively. The viscosity of the 2% STABILEZE QM in 18.5 ppg in Cs formate brine at 75° F., 107° F., 140° F. and 180° F. is 309, 250, greater than 875, and 5605 cP at 1.7 sec-1, respectively.

Rheology results of 12 ppg Sodium bromide viscosified with 3% STABILEZE at pH 7 indicate a viscosity of the fluid at 75° F., 107° F. and 140° F. is respectively 627, 409, and 471 cP at 100 sec-1. The viscosity of 12 ppg sodium bromide with 3% STABILEZE QM buffered to a of pH 8 at 75° F., 107° F. and 140° F. is 495, 380, and 325 cP, respectively, at about 100 sec-1. Viscosity of 3% STABILEZE QM in 12 ppg Sodium Bromide buffered to a pH of 10 at 75° F., 107° F. and 140° F. is 555, 365, and 287 cP, respectively, at about 100 sec-1. At 140° F., 12 ppg sodium bromide viscosified with 3% STABILEZE QM delivered the maximum viscosity when the fluid was buffered to a pH of 7 at 100 sec-1. 12 ppg Sodium bromide viscosified with 3% STABILEZE buffered to a pH of 7 was developed to a maximum viscosity at higher shear rates when it was buffered to 7 pH.

At all different buffer conditions the STABILEZE QM continued to solubilize with temperature and time.

What is claimed is:

1. A well servicing fluid formulated with ingredients comprising:
    a viscosifying polymer that is a crosslinked copolymer of an ethylenically unsaturated dicarboxylic anhydride and an alkyl vinyl ether, or the di-acid thereof;
    a pH adjuster that maintains a pH of greater than 5.5;
    a non-emulsifier; and
    a solvent containing a solution of alcohol and aqueous base, the solvent ranging from about 75% to less than 95% by weight based on the total weight of the well servicing fluid, a concentration of the viscosifying polymer in the well servicing fluid being at least 15 pounds per thousand gallons (pptg) and the viscosifying polymer exhibiting structural and chemical properties sufficient to yield a viscosity of at least 23 cP at 102 sec$^{-1}$ for the well servicing fluid at the concentration.

2. The fluid of claim 1, wherein the ether has the formula ROR', where R is a $C_1$-$C_4$ alkyl and R' is a vinyl group.

3. The fluid of claim 2, wherein the ethylenically unsaturated dicarboxylic anhydride is maleic anhydride.

4. The fluid of claim 3, wherein the ether is methyl vinyl ether.

5. The fluid of claim 1, wherein the crosslinked copolymer is crosslinked using an alpha, omega diene having from 6 to 20 carbon atoms.

6. The fluid of claim 1, wherein the viscosifying polymer is a poly (methyl vinyl ether/maleic anhydride) decadiene crosspolymer.

7. The fluid of claim 1, wherein the di-acid is a poly (methyl vinyl ether/maleic acid) decadiene crosspolymer.

8. The fluid of claim 1, wherein the solvent comprises at least one alcohol chosen from methanol, ethanol, propanol and butanol.

9. The fluid of claim 8, wherein the solvent comprises at least 20% by weight alcohol, based on the total weight of the solvent.

10. The fluid of claim 1, further comprising nitrogen gas, liquid carbon dioxide or supercritical carbon dioxide.

11. The fluid of claim 1, wherein the solvent comprises brine having a salt concentration of 0.5% by weight or greater.

12. The fluid of claim 11, wherein the brine comprises at least one salt chosen from halide salts and formate salts.

13. The fluid of claim 11, wherein the brine comprises at least one salt chosen from NaCl, KCl, $CaCl_2$, $MgCl_2$, $NH_4Cl$, $CaBr_2$, $NaBr_2$, $ZnBr_2$, sodium formate, potassium formate, and cesium formate.

14. The fluid of claim 1, wherein the pH adjuster is chosen from NaOH, KOH, $Ca(OH)_2$, sodium bicarbonate, potassium carbonate, and sodium carbonate.

15. The fluid of claim 1, further comprising a breaker.

16. The fluid of claim 15, wherein the breaker is a compound chosen from percarbonates, perchlorates, peracids, peroxides, persulfates and encapsulated potassium persulfates.

17. The fluid of claim 1, wherein a proppant is mixed with the well servicing fluid.

18. The fluid of claim 1, wherein the solvent is chosen from fresh water, brine, and produced water.

19. The fluid of claim 18, wherein the solvent is seawater.

20. The fluid of claim 1, wherein the fluid is formulated with at least one additional compound chosen from additional viscosifying agents, surfactants, clay stabilization additives, scale dissolvers, biopolymer degradation additives, fluid loss control additives and high temperature stabilizers.

21. The fluid of claim 1, wherein the well servicing fluid is in the form of a gel and the gel contains the non-emulsifier.

22. The fluid of claim 21, wherein the well servicing fluid is in a well in a formation.

23. The fluid of claim 1, wherein the solvent comprises at least 75% by weight alcohol, based on the total weight of the solvent.

24. The fluid of claim 23, wherein the viscosifying polymer concentration is 15 to 60 pptg and the solvent comprises 75% to 95% by weight alcohol, based on the total weight of the solvent.

* * * * *